(12) United States Patent
Gwon et al.

(10) Patent No.: US 11,740,644 B2
(45) Date of Patent: Aug. 29, 2023

(54) LOW DROP-OUT REGULATORS AND POWER MANAGEMENT INTEGRATED CIRCUITS INCLUDING THE SAME

(71) Applicants: Huidong Gwon, Yongin-si (KR); Byongdeok Choi, Seoul (KR); Taehwang Kong, Suwon-si (KR); Junhyeok Yang, Seoul (KR); Junhwan Jang, Seoul (KR)

(72) Inventors: Huidong Gwon, Yongin-si (KR); Byongdeok Choi, Seoul (KR); Taehwang Kong, Suwon-si (KR); Junhyeok Yang, Seoul (KR); Junhwan Jang, Seoul (KR)

(*) Notice: Subject to any disclaimer, the term of this patent is extended or adjusted under 35 U.S.C. 154(b) by 61 days.

(21) Appl. No.: 17/541,157

(22) Filed: Dec. 2, 2021

(65) Prior Publication Data

US 2022/0300021 A1    Sep. 22, 2022

(30) Foreign Application Priority Data

Mar. 18, 2021  (KR) .......................... 10-2021-0035234

(51) Int. Cl.
*G05F 1/575*  (2006.01)
*H02M 3/158*  (2006.01)
*H02M 1/00*   (2006.01)

(52) U.S. Cl.
CPC .......... *G05F 1/575* (2013.01); *H02M 1/0045* (2021.05); *H02M 3/158* (2013.01)

(58) Field of Classification Search
CPC ..... H02M 3/158; H02M 1/0045; G05F 1/575; G05F 1/585; G05F 1/59; G05F 1/56;

(Continued)

(56) References Cited

U.S. PATENT DOCUMENTS 7,119,606 B2   10/2006  Fahim
7,218,083 B2    5/2007  Wang et al.
(Continued)

FOREIGN PATENT DOCUMENTS

KR   100900267 B1    5/2009
KR   100981034 B1    9/2010
(Continued)

OTHER PUBLICATIONS

Chiu et al. "A 0.6 V Resistance-Locked Loop Embedded Digital Low Dropout Regulator in 40 nm CMOS With 80.5% Power Supply Rejection Improvement" IEEE Transactions on Circuits and Systems I: Regular Papers 62(1):59-69 (Jan. 2015).

(Continued)

*Primary Examiner* — Nguyen Tran
(74) *Attorney, Agent, or Firm* — Myers Bigel, P.A.

(57) ABSTRACT

A low drop-out (LDO) regulator includes a voltage-to-time converter (VTC) responsive to a reference voltage and an output voltage. The VTC generates a voltage pulse signal having: (i) a sign associated with a magnitude of the output voltage relative to a magnitude of the reference voltage, and (ii) a first pulse width proportional to a difference the output voltage and the reference voltage. A driving time-to-current converter (TIC) drives a gate node with a non-zero driving current proportional to the first pulse width of the voltage pulse signal. A slew adjusting circuit drives the gate node with a non-zero slew adjusting current, in response to the first pulse width of the voltage pulse signal being equal to or greater than reference time interval. A compensation TIC drives the output node with a non-zero compensation current having a magnitude proportional to the first pulse width of the voltage pulse signal.

20 Claims, 19 Drawing Sheets

(58) Field of Classification Search
CPC .......... G05F 1/565; G05F 1/569; G05F 1/571; G05F 1/573
See application file for complete search history.

(56) References Cited

U.S. PATENT DOCUMENTS

| | | | |
|---|---|---|---|
| 7,253,595 | B2 | 8/2007 | Oddoart et al. |
| 7,629,783 | B2 | 12/2009 | Chang |
| 8,598,854 | B2 | 12/2013 | Soenen et al. |
| 9,213,347 | B2 | 12/2015 | Kim et al. |
| 9,651,962 | B2 | 5/2017 | Bernardon |
| 9,843,324 | B1 | 12/2017 | Hafizi et al. |
| 10,101,758 | B2 | 10/2018 | Luo et al. |
| 2009/0322295 | A1* | 12/2009 | Scoones ................ G05F 1/56 323/282 |
| 2018/0351450 | A1* | 12/2018 | Pelicia ................ H02M 3/07 |
| 2020/0150703 | A1 | 5/2020 | Chang et al. |
| 2023/0009027 | A1* | 1/2023 | Chen ................ G05F 1/595 |

FOREIGN PATENT DOCUMENTS

| | | | |
|---|---|---|---|
| KR | 20110078479 | A | 7/2011 |
| KR | 101790943 | B1 | 10/2017 |
| KR | 101847167 | B1 | 4/2018 |

OTHER PUBLICATIONS

Huang et al. "An Analog-Proportional Digital-Integral Multiloop Digital LDO With PSR Improvement and LCO Reduction" IEEE Journal of Solid-State Circuits 55(6):1637-1650 (Jun. 2020).

Kundu et al. "A Fully Integrated Digital LDO With Built-In Adaptive Sampling and Active Voltage Positioning Using a Beat-Frequency Quantizer" IEEE Journal of Solid-State Circuits 54(1):109-120 (Jan. 2019).

Park et al. "A 0.4-to-1.2V 0.0057mm2 55fs-Transient-FoM Ring-Amplifier-Based Low-Dropout Regulator with Replica-Based PSR Enhancement" 2020 IEEE International Solid-State Circuits Conference (Feb. 19, 2020).

Salem et al. "A Successive Approximation Recursive Digital Low-Dropout Voltage Regulator With PD Compensation and Sub-LSB Duty Control" IEEE Journal of Solid-State Circuits 53(1):35-49 (Jan. 2018).

Wang et al. "A Dynamically High-Impedance Charge-Pump-Based LDO With Digital-LDO-Like Properties Achieving a Sub-4fs FoM" IEEE Journal of Solid-State Circuits 55(3):719-730 (Mar. 2020).

Yang et al. "A 65nm Inverter-Based Low-Dropout Regulator with Rail-to-Rail Regulation and over-20dB PSR at 0.2V Lowest Supply Voltage" 2017 IEEE International Solid-State Circuits Conference (ISSCC) (Feb. 6, 2017).

\* cited by examiner

LOW DROP-OUT REGULATORS AND POWER MANAGEMENT INTEGRATED CIRCUITS INCLUDING THE SAME

REFERENCE TO PRIORITY APPLICATION

This application claims priority under 35 U.S.C. § 119 to Korean Patent Application No. 10-2021-0035234, filed Mar. 18, 2021, the disclosure of which is hereby incorporated herein by reference.

TECHNICAL FIELD

Example embodiments of the present disclosure relate to integrated circuits, and, more particularly, to voltage regulators and integrated circuits including the same.

BACKGROUND

Low Drop-Out (LDO) regulators are devices which can provide a stable voltage. An LDO regulator may be a linear regulator, which provides a lower output voltage than an input voltage.

Although an LDO regulator may have power losses because the output voltage is less than the input voltage, the LDO may nonetheless advantageously provide a stable output voltage. An LDO regulator may also have superior line and load regulation characteristics. Thus, an LDO regulator may have many applications in integrated circuits, including power management integrated circuits (PMICs).

SUMMARY

Example embodiments provide an LDO regulator capable of enhancing performance.

Example embodiments provide a PMIC including an LDO regulator capable of enhancing performance.

According to example embodiments, an LDO regulator includes a voltage to time converter (VTC), a driving time to current converter (TIC), a slew adjusting circuit, a pass transistor, and a compensation TIC. The VTC can receive a reference voltage and an output voltage provided from an output node, and generate a voltage pulse signal having a sign and a first pulse width. The sign can be associated with a relative magnitude of the output voltage with respect to the reference voltage, and the first pulse width may be proportional to a difference between the reference voltage and the output voltage. The driving TIC charges (or discharges) a gate node with a driving current proportional to the first pulse width of the voltage pulse signal, in response to the sign indicating that the relative magnitude has a non-zero value. The slew adjusting circuit may be activated in response to the first pulse width of the voltage pulse signal being equal to or greater than a reference time interval, and may charge (or discharge) the gate node with a slew adjusting current, based on the voltage pulse signal. The pass transistor, which has a gate terminal connected to the gate node, regulates an input voltage to thereby provide the output voltage to an output node, based on the driving current and selectively based on the slew adjusting current. The compensation TIC charges or discharges the output node with a compensation current corresponding to the first pulse width of the voltage pulse, in response to the sign indicating that the relative magnitude has a non-zero value.

According to example embodiments, a PMIC includes at least one switching regulator, a plurality of LDO regulators and a controller. The at least one switching regulator generates a conversion voltage from a battery voltage. The plurality of regulators generate a plurality of output voltages based on the conversion voltage to thereby provide the plurality of output voltages to a plurality of consumers. The controller generates a voltage control signal to adjust a switching timing of the at least one switching regulator based on the conversion voltage. Each of the plurality of regulators includes a voltage to time converter (VTC), a driving time to current converter (TIC), a slew adjusting circuit, a pass transistor and a compensation TIC. The VTC receives a reference voltage and a corresponding output voltage provided from an output node, and generates a voltage pulse signal having a sign and a first pulse width. The sign is associated with a relative magnitude of the output voltage with respect to the reference voltage, and the first pulse width is proportional to a difference between the reference voltage and the output voltage. The driving TIC charges or discharges a gate node with a driving current proportional to the first pulse width of the voltage pulse signal, in response to the sign indicating that the relative magnitude has a non-zero value. The slew adjusting circuit is activated in response to the first pulse width of the voltage pulse signal being equal to or greater than a reference time interval, and charges (or discharges) the gate node with a slew adjusting current based on the voltage pulse signal. The pass transistor is connected to the gate node, and regulates an input voltage to provide the output voltage to an output node, based on the driving current and selectively based on the slew adjusting current. The compensation TIC charges (or discharges) the output node with a compensation current corresponding to the first pulse width of the voltage pulse, in response to the sign indicating that the relative magnitude has a non-zero value.

According to additional example embodiments, an LDO regulator includes a voltage to time converter (VTC), a driving time to current converter (TIC), a slew adjusting circuit, a pass transistor and a compensation TIC. The VTC receives a reference voltage and an output voltage provided from an output node, and generates a voltage pulse signal having a sign and a first pulse width. The sign is associated with a relative magnitude of the output voltage with respect to the reference voltage, and the first pulse width, is proportional to a difference between the reference voltage and the output voltage. The driving TIC charges or discharges a gate node with a driving current proportional to the first pulse width of the voltage pulse signal in response to the sign indicating that the relative magnitude has a non-zero value, based on the voltage pulse signal. The slew adjusting circuit is activated in response to the first pulse width of the voltage pulse signal being equal to or greater than a reference time interval and charges or discharges the gate node with a slew adjusting current based on the voltage pulse signal. The pass transistor is connected to the gate node, and regulates an input voltage to provide the output voltage to an output node, based on the driving current and selectively based on the slew adjusting current. The compensation TIC charges (or discharges) the output node with a compensation current corresponding to the first pulse width of the voltage pulse, in response to the sign indicating that the relative magnitude has a non-zero value. The slew adjusting circuit also detects that the pulse width of the voltage pulse signal is equal to or greater than a reference time interval during a switching period of the LDO regulator, generates a slew detection signal having a second pulse width corresponding a difference between the first pulse width and the reference time interval and provides the gate node with the slew adjusting current proportional to the second pulse width of the slew detection signal.

Accordingly, the LDO regulator according to example embodiment may: (i) drive the output node digitally by converting a difference between the input voltage and the output voltage, to thereby reduce a voltage headroom associated with an analog LDO regulator, (ii) maintain a level of the output voltage even if the load current changes abruptly by employing the slew adjusting circuit, and (iii) increase stability even if the load current is small by employing the compensation TIC.

BRIEF DESCRIPTION OF THE DRAWINGS

The above and other features of the present disclosure will become more apparent by describing in detail example embodiments thereof with reference to the accompanying drawings.

DETAILED DESCRIPTION OF THE EMBODIMENTS

Figure 1:
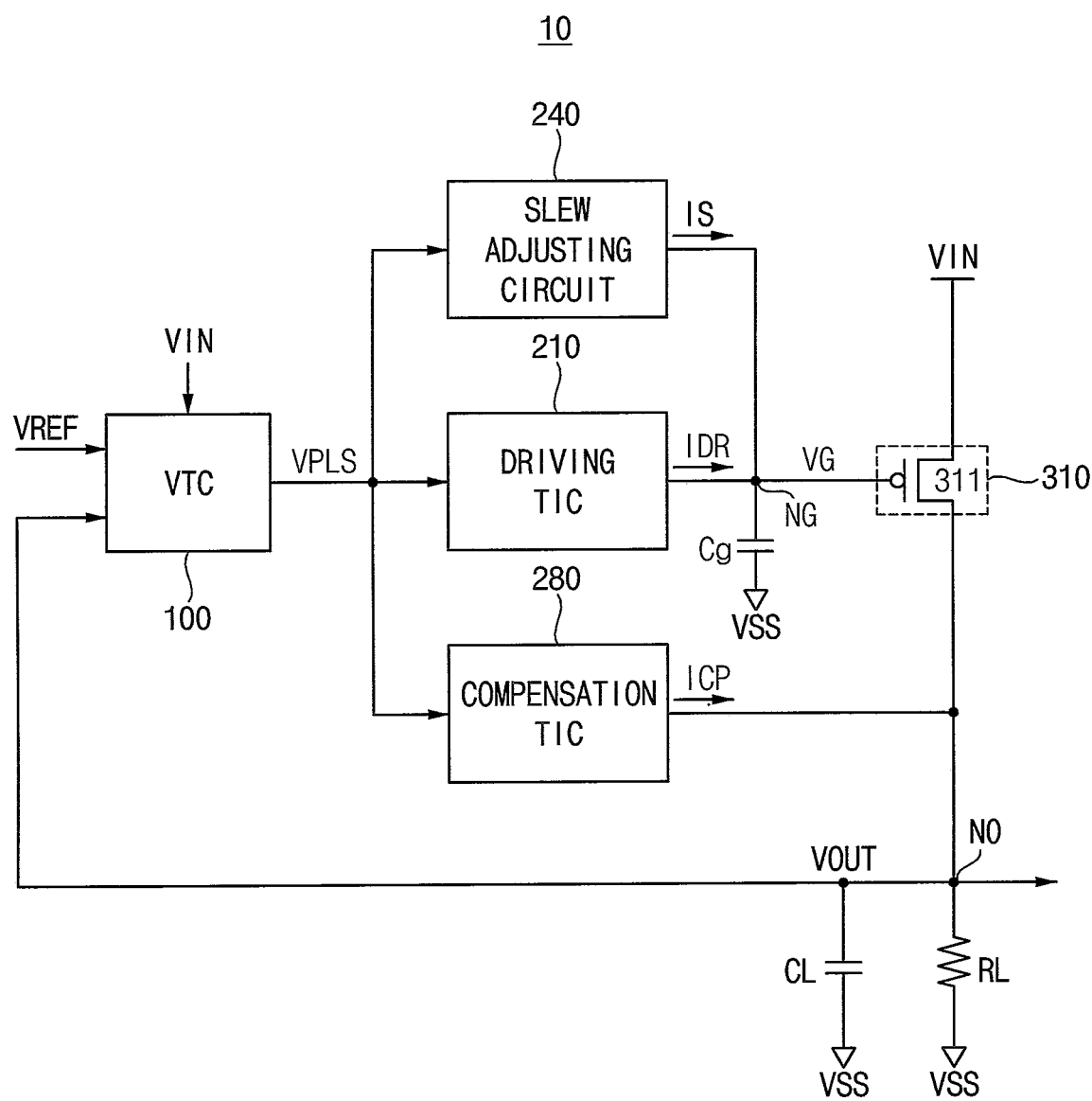
FIG. 1 is a block diagram illustrating a low drop-out (LDO) regulator according to example embodiments.

Example embodiments of the present disclosure will be described more fully hereinafter with reference to the accompanying drawings. Like reference numerals may refer to like elements throughout the accompanying drawings.

FIG. 1 is a block diagram illustrating a low drop-out (LDO) regulator according to example embodiments. Referring to FIG. 1, an LDO regulator 10 may include a voltage-to-time converter (VTC) 100, a pass element 310 including a pass transistor 311, a driving time-to-current converter (TIC) 210, a slew adjusting circuit 240, a compensation TIC 280 and a charging capacitor Cg.

In FIG. 1, a load resistor RL and a load capacitor CL, which are connected between the output node NO and a ground voltage VSS, are also illustrated. As shown, the load capacitor CL is connected between the output node NO and the ground voltage VSS in parallel with the load resistor RL, to thereby form a voltage supporting RC circuit at the output node NO.

The charging capacitor Cg may be coupled between a gate node NG (e.g., gate terminal of pass transistor 311) and the ground voltage VSS. The charging capacitor Cg may decrease a gate voltage VG of the gate node NG in response to the charging capacitor Cg being discharged and may increase the gate voltage VG of the gate node NG in response to the charging capacitor Cg being charged. The charging capacitor Cg may be implemented with a parasitic capacitance, in some embodiments. The VTC 100 may receive a reference voltage VREF and an output voltage VOUT, which is provided as feedback from the output node NO, and may generate a voltage pulse signal VPLS having a sign (e.g., + or − magnitude) and a first pulse width based on a difference between the reference voltage VREF and the output voltage VOUT. In some embodiments, the sign may be associated with a relative magnitude of the output voltage VOUT with respect to the reference voltage VREF, and the first pulse width may be proportional to a difference, in magnitude (e.g., voltage difference), between the reference voltage VREF and the output voltage VOUT.

Figure 15:
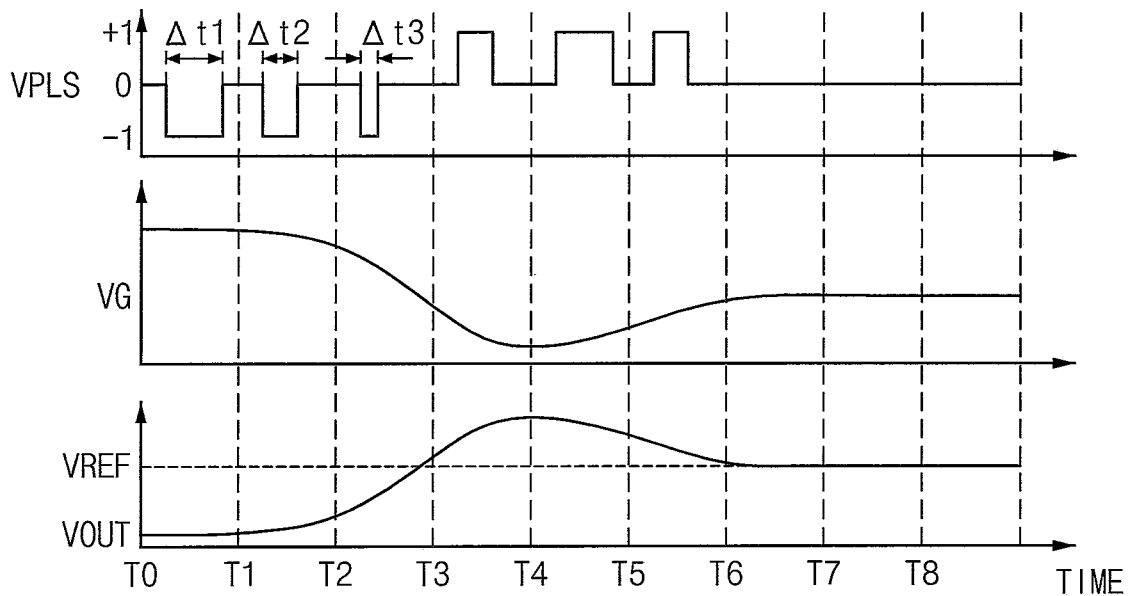
FIG. 15 is a timing diagram illustrating operation of the VTC in the LDO regulator of FIG. 1, according to example embodiments.

The VTC 100 may generate the voltage pulse signal VPLS having an active "on-time" corresponding to the first pulse width as a down signal in response to the sign indicating that the output voltage VOUT is smaller than the reference voltage VREF (e.g., −1 in FIG. 15). The driving TIC 210 may discharge the gate node NG or the charging capacitor Cg in response to the down signal. When the charging capacitor Cg is discharged, a voltage level of the gate voltage VG decreases and causes the pass transistor 311 is turned-on. In response to the pass transistor 311 being turned-on, the pass transistor 311 provides the output node NO with a current based on a magnitude of an input voltage VIN. In response, a voltage level of the output voltage VOUT at the output node NO may increase when the current through the pass transistor 311 is a "pull-up" current. The pass transistor 311 may have a first current carrying terminal responsive to the input voltage VIN and a second current carrying terminal electrically coupled to the output node NO.

The VTC 100 may generate the voltage pulse signal VPLS having an on-time corresponding to the first pulse width as an up signal in response to the sign indicating that the output voltage VOUT is greater than the reference voltage VREF (e.g., +1 in FIG. 15). The driving TIC 210 may charge the gate node NG or the charging capacitor Cg in response to the up signal. When the charging capacitor Cg is charged, the voltage level of the gate voltage VG increases. This increase in VG causes the pass transistor 311 to turn-off, to thereby decrease a "pull-up" current provided to the output node NO. In response, a voltage level of the output voltage VOUT at the output node NO decreases.

The driving TIC 210 may receive the voltage pulse signal VPLS and may charge or discharge a gate node NG with a driving current IDR, which is proportional to the first pulse width of the voltage pulse signal VPLS, in response to the sign indicating that the relative magnitude has a non-zero value. The driving TIC 210 may generate the driving current IDR by performing a time-to-current conversion on the received voltage pulse signal VPLS, and may: (i) provide the driving current IDR to the gate node NG, or (ii) withdraw a current corresponding to the driving current IDR from the gate node NG, based on the VPLS signal.

In addition, the slew adjusting circuit 240 may receive the voltage pulse signal VPLS, and may be activated in response to the first pulse width of the voltage pulse signal VPLS being equal to or greater than a reference time interval, and may charge or discharge the gate node NG with a slew adjusting current IS (based on the voltage pulse signal VPLS) to thereby increase a slew rate of the output voltage VOUT.

The pass transistor 311 may be configured as a p-channel metal-oxide semiconductor (PMOS) transistor, which has a source terminal receiving the input voltage VIN, a gate terminal coupled to the gate node NG, and a drain terminal coupled to the output node NO. The pass transistor 311 may regulate how the input voltage VIN is provided as an output voltage VOUT to the output node NO, based on a combination of the driving current IDR and selectively based on the slew adjusting current IS.

The slew adjusting circuit 240 may draw (i.e., "sink") the slew adjusting current IS away from the gate node NG in response to the first pulse width of the voltage pulse signal VPLS being equal to or greater than the reference time interval. In this case, both the driving current IDR and the slew adjusting current IS are withdrawn from the gate node NG, and a voltage level the gate voltage VG at the gate node NG decreases. Therefore, the gate node NG is driven faster (by both elements 240, 210) and a slew rate of the gate voltage VG and the output voltage VOUT may be increased (or enhanced).

The compensation TIC 280 may receive the voltage pulse signal VPLS, may generate a compensation current ICP corresponding to the first pulse width of the voltage pulse signal VPLS and may charge or discharge the output node NO with the compensation current ICP. The compensation TIC 280 may generate the compensation current ICP by performing a time-to-current conversion on the voltage pulse signal VPLS, and may provide the compensation current ICP directly to the output node NO.

The driving TIC 210 and the compensation TIC 280 may provide a feed forward path with respect to the output node NO and may be associated with a "zero" in a frequency domain. Thus, even if a current consumed by the load resistor RL increases, frequency stability of the LDO regulator 10 may be compensated by the presence of the zero (in the frequency domain), which may be referred to as a compensation zero.

Figure 2:
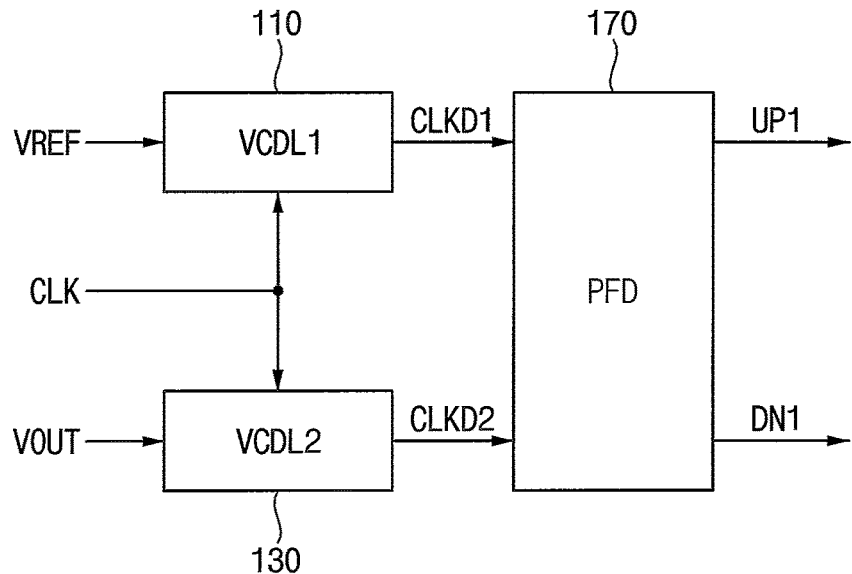
FIG. 2 is a block diagram illustrating an example of the voltage to time converter (VTC) in the LDO regulator of FIG. 1, according to example embodiments.

FIG. 2 is a block diagram illustrating an example of the voltage-to-time converter (VTC) in the LDO regulator of FIG. 1 according to example embodiments. Referring to FIG. 2, a VTC 100a may include a first voltage controlled delay line VCDL1 110, a second voltage controlled delay line VCDL2 130, and a phase/frequency detector PFD 170. As shown, the first voltage controlled delay line 110 may receive the reference voltage VREF and a clock signal CLK, and may output a first delayed clock signal CLKD1 by delaying the clock signal CLK based on the reference voltage VREF. Similarly, the second voltage controlled delay line 130 may receive the output voltage VOUT and the clock signal CLK, and may output a second delayed clock signal CLKD2 by delaying the clock signal CLK based on the output voltage VOUT.

The phase/frequency detector 170 may receive the first delayed clock signal CLKD1 and the second delayed clock signal CLKD2, may detect a phase difference between the first delayed clock signal CLKD1 and the second delayed clock signal CLKD2 and may generate the voltage pulse signal VPLS including a down signal DN1 or an up signal UP1 having an on-time corresponding to the first pulse width, based on the phase difference.

Figure 3:
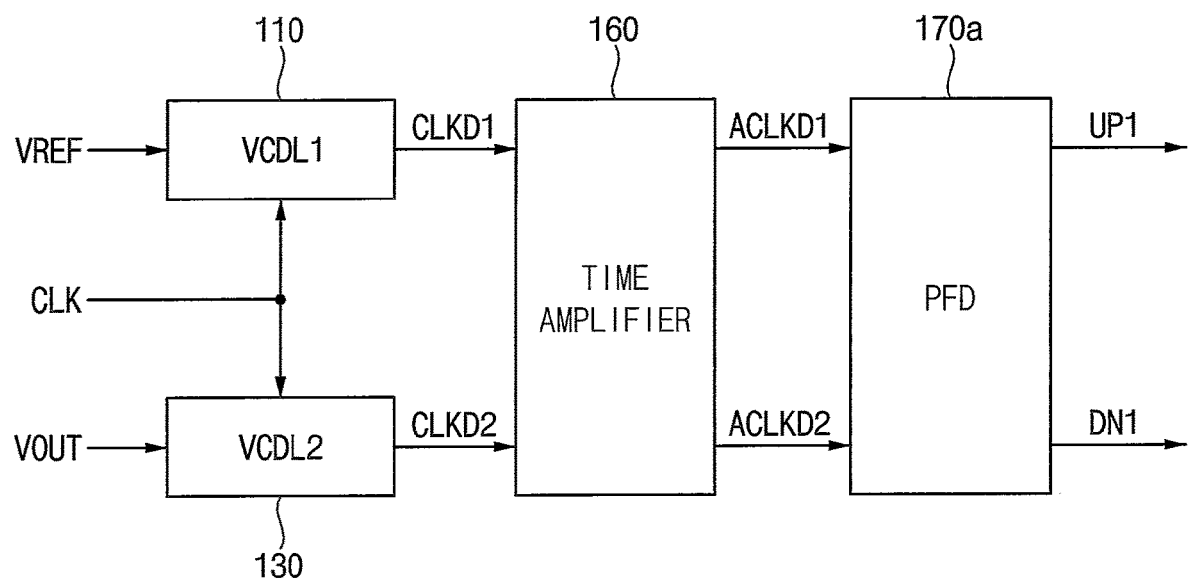
FIG. 3 is a block diagram illustrating an example of the VTC in the LDO regulator of FIG. 1, according to example embodiments.

FIG. 3 is a block diagram illustrating an example of the VTC in the LDO regulator of FIG. 1 according to example embodiments.

Referring to FIG. 3, an alternative VTC 100b may include a first voltage controlled delay line VCDL1 110, a second voltage controlled delay line VCDL2 130, a time amplifier 160, and a phase/frequency detector PFD 170a. The first voltage controlled delay line 110 may receive the reference voltage VREF and a clock signal CLK, and may output a first delayed clock signal CLKD1 by delaying the clock signal CLK based on the reference voltage VREF. The second voltage controlled delay line 130 may receive the output voltage VOUT and the clock signal CLK, and may output a second delayed clock signal CLKD2 by delaying the clock signal CLK based on the output voltage VOUT.

In addition, the time amplifier 160 may receive the first delayed clock signal CLKD1 and the second delayed clock signal CLKD2 and may amplify the first delayed clock signal CLKD1 and the second delayed clock signal CLKD2 to generate an amplified first delayed clock signal ACLKD1 and an amplified second delayed clock signal ACLKD2. Next, the phase/frequency detector 170a may receive the amplified first delayed clock signal ACLKD1 and the amplified second delayed clock signal ACLKD2, may detect a phase difference between the amplified first delayed clock signal ACLKD1 and the amplified second delayed clock signal ACLKD2, and may generate the voltage pulse signal VPLS including a down signal DN1 or an up signal UP1 having an on-time corresponding to the first pulse width, based on the phase difference.

Figure 4:
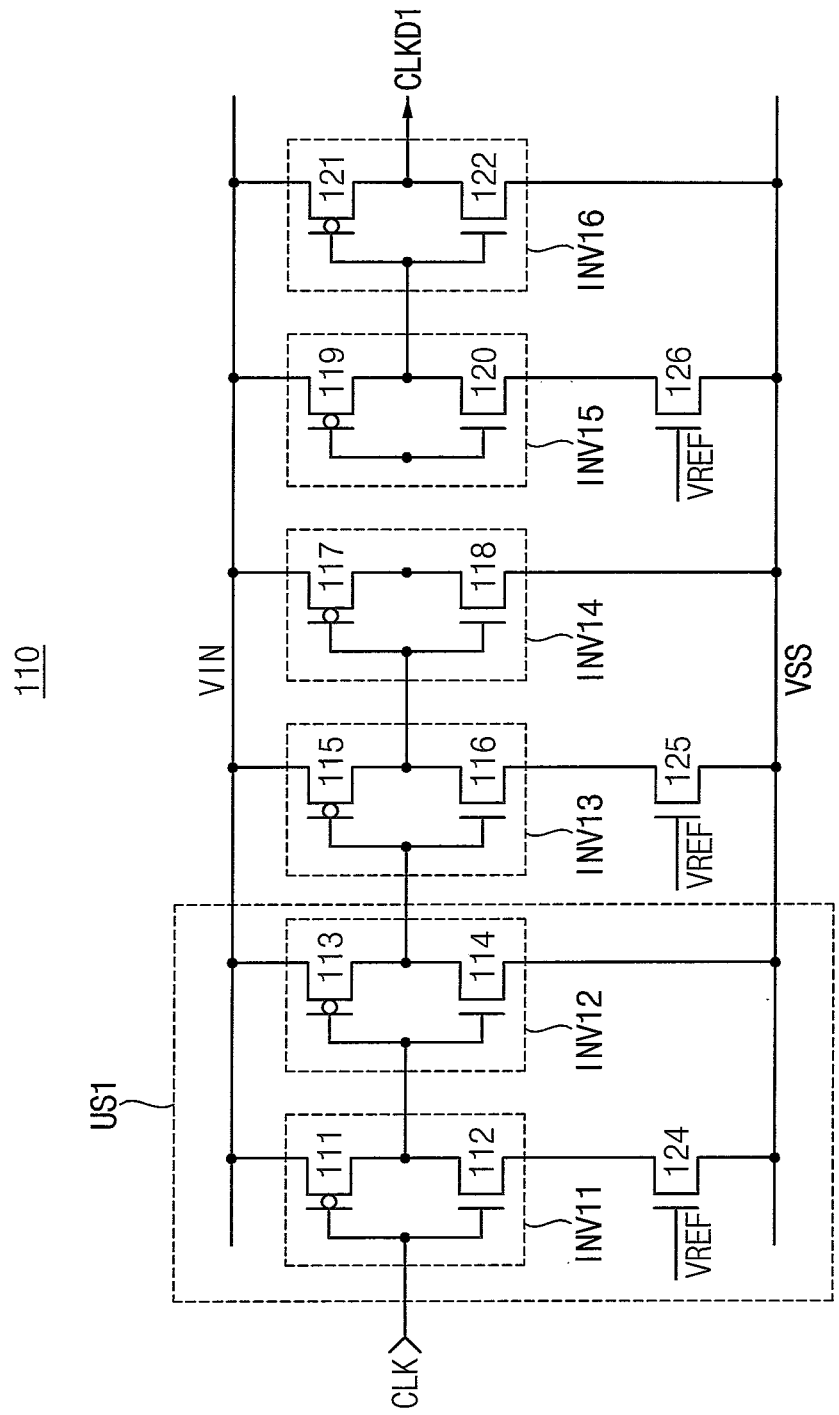
FIG. 4 is a circuit diagram illustrating an example of the first voltage controlled delay line in the VTC of FIG. 2 or FIG. 3, according to example embodiments.

FIG. 4 is a circuit diagram illustrating an example of the first voltage controlled delay line in the VTC of FIG. 2 or FIG. 3, according to some example embodiments. Referring to FIG. 4, the first voltage controlled delay line 110 may include a plurality of first inverters INV11, INV12, INV13, INV14, INV15 and INV16 and a plurality of first n-channel metal-oxide semiconductor (NMOS) transistors 124, 125 and 126. Each of the first NMOS transistor 124, 125 and 126 may be connected between corresponding one of odd inverters INV11, INV13 and INV15 from among the plurality of first inverters INV11, INV12, INV13, INV14, INV15 and INV16 and the ground voltage VSS, and each of the first NMOS transistors 124, 125 and 126 may have a gate terminal, which receives the reference voltage VREF.

The inverter INV11 may include a PMOS transistor 111 and an NMOS transistor 112 connected in series between the input voltage VIN and the NMOS transistor 124, which operates as a current regulating pull-down transistor to influence a switching speed of the inverter INV11. Gates of the PMOS transistor 111 and an NMOS transistor 112 may receive the clock signal CLK. The inverter INV12 may include a PMOS transistor 113 and an NMOS transistor 114 connected in series between the input voltage VIN and the ground voltage VSS. Gates of the PMOS transistor 113 and an NMOS transistor 114 may receive an output of the inverter INV11.

The inverter INV13 may include a PMOS transistor 115 and an NMOS transistor 116 connected in series between the input voltage VIN and the NMOS transistor 125, which operates as a current regulating pull-down transistor to influence a switching speed of the inverter INV13. Gates of the PMOS transistor 115 and an NMOS transistor 116 may receive an output of the inverter INV12. The inverter INV14 may include a PMOS transistor 117 and an NMOS transistor 118 connected in series between the input voltage VIN and the ground voltage VSS. Gates of the PMOS transistor 117 and an NMOS transistor 118 may receive an output of the inverter INV13.

The inverter INV15 may include a PMOS transistor 119 and an NMOS transistor 120 connected in series between the input voltage VIN and the NMOS transistor 126, which operates as a current regulating pull-down transistor to influence a switching speed of the inverter INV15. Gates of the PMOS transistor 119 and an NMOS transistor 120 may receive an output of the inverter INV14. The inverter INV16 may include a PMOS transistor 121 and an NMOS transistor 122 connected in series between the input voltage VIN and the ground voltage VSS. Gates of the PMOS transistor 121 and an NMOS transistor 122 may receive an output of the inverter INV15. Drains of the PMOS transistor 121 and an NMOS transistor 122 may be connected to each other and may provide the first delayed clock signal CLKD1.

The inverters INV11 and INV12 and the NMOS transistor 124 may constitute a "non-inverting" unit stage US1. Therefore, the first voltage controlled delay line 110 may output the first delayed clock signal CLKD1 by delaying the clock signal CLK by a first delay amount based on a magnitude of the reference voltage VREF (i.e., conductivity of NMOS pull-down transistor 124).

Figure 5:
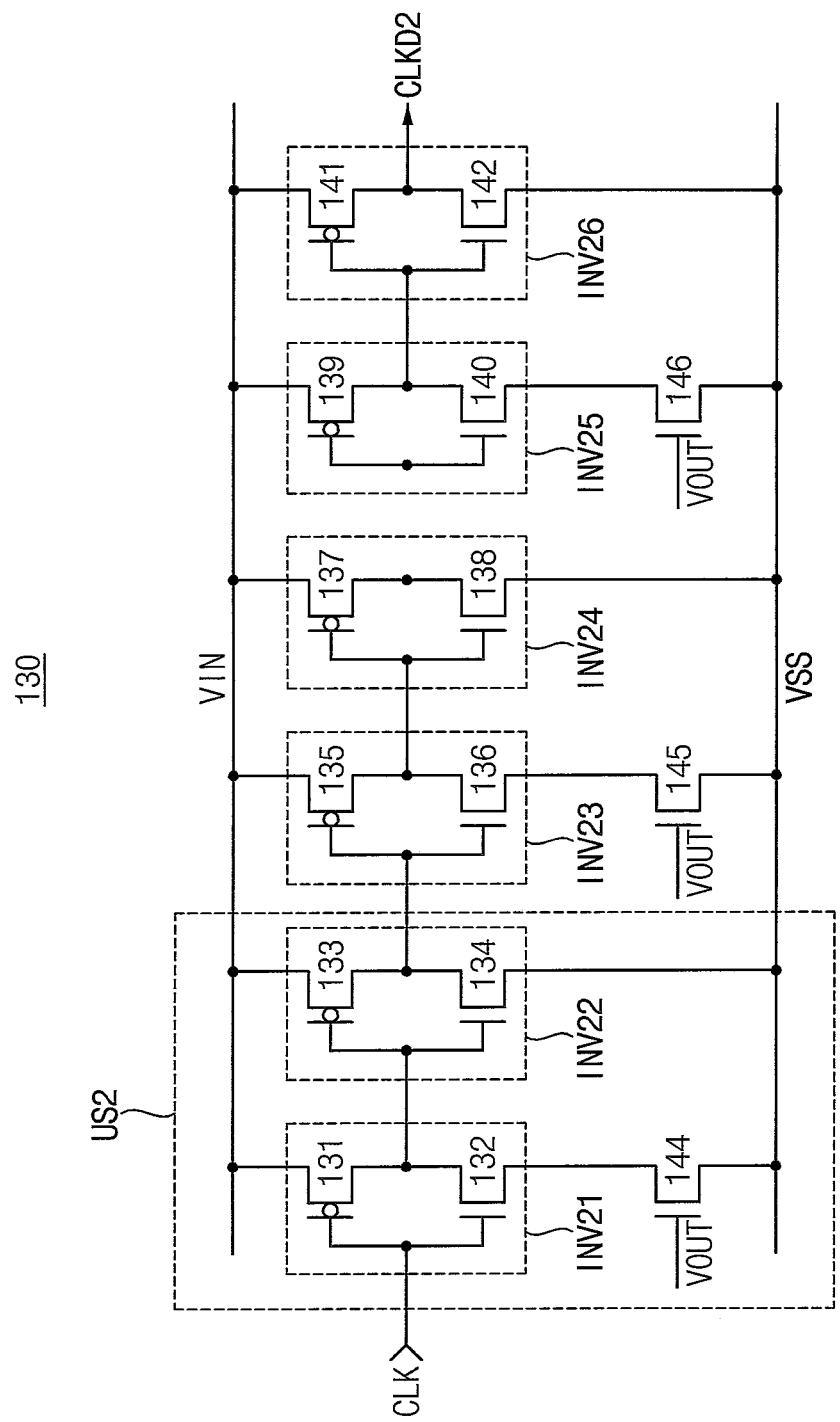
FIG. 5 is a circuit diagram illustrating an example of the second voltage controlled delay line in the VTC of FIG. 2 or FIG. 3, according to example embodiments.

FIG. 5 is a circuit diagram illustrating an example of the second voltage controlled delay line in the VTC of FIG. 2 or FIG. 3 according to example embodiments. Referring to FIG. 5, the second voltage controlled delay line 130 may include a plurality of first inverters INV21, INV22, INV23, INV24, INV25 and INV26 and a plurality of second NMOS "pull-down" transistors 144, 145 and 146, which regulate switching speed (i.e., delay provided by the delay line). Each of the second NMOS transistor 144, 145 and 146 may be connected between corresponding one of odd inverters INV21, INV23 and INV25 from among the plurality of second inverters INV21, INV22, INV23, INV24, INV25 and INV26 and the ground voltage VSS, and each of the second NMOS transistors 144, 145 and 146 may have a gate to receive the output voltage VOUT.

The inverter INV21 may include a PMOS transistor 131 and an NMOS transistor 132 connected in series between the input voltage VIN and the NMOS transistor 144. Gates of the PMOS transistor 131 and an NMOS transistor 132 may receive the clock signal CLK. The inverter INV22 may include a PMOS transistor 133 and an NMOS transistor 134 connected in series between the input voltage VIN and the ground voltage VSS. Gates of the PMOS transistor 133 and an NMOS transistor 134 may receive an output of the inverter INV21.

The inverter INV23 may include a PMOS transistor 135 and an NMOS transistor 136 connected in series between the input voltage VIN and the NMOS transistor 145. Gates of the PMOS transistor 135 and an NMOS transistor 136 may receive an output of the inverter INV22. The inverter INV24 may include a PMOS transistor 137 and an NMOS transistor 138 connected in series between the input voltage VIN and the ground voltage VSS. Gates of the PMOS transistor 137 and an NMOS transistor 138 may receive an output of the inverter INV23.

The inverter INV25 may include a PMOS transistor 139 and an NMOS transistor 140 connected in series between the input voltage VIN and the NMOS transistor 146. Gates of the PMOS transistor 139 and an NMOS transistor 140 may receive an output of the inverter INV24. The inverter INV26 may include a PMOS transistor 141 and an NMOS transistor 142 connected in series between the input voltage VIN and the ground voltage VSS. Gates of the PMOS transistor 141 and an NMOS transistor 142 may receive an output of the inverter INV25. Drains of the PMOS transistor 141 and an NMOS transistor 142 may be connected to each other and may provide the second delayed clock signal CLKD2.

The inverters INV21 and INV22 and the NMOS transistor 144 may constitute a unit stage US2, which provides a "non-inverting" unit delay based on a magnitude of VOUT. Therefore, the second voltage controlled delay line 130 may output the second delayed clock signal CLKD2 by delaying the clock signal CLK by a second delay amount based on the output voltage VOUT.

Figure 6:
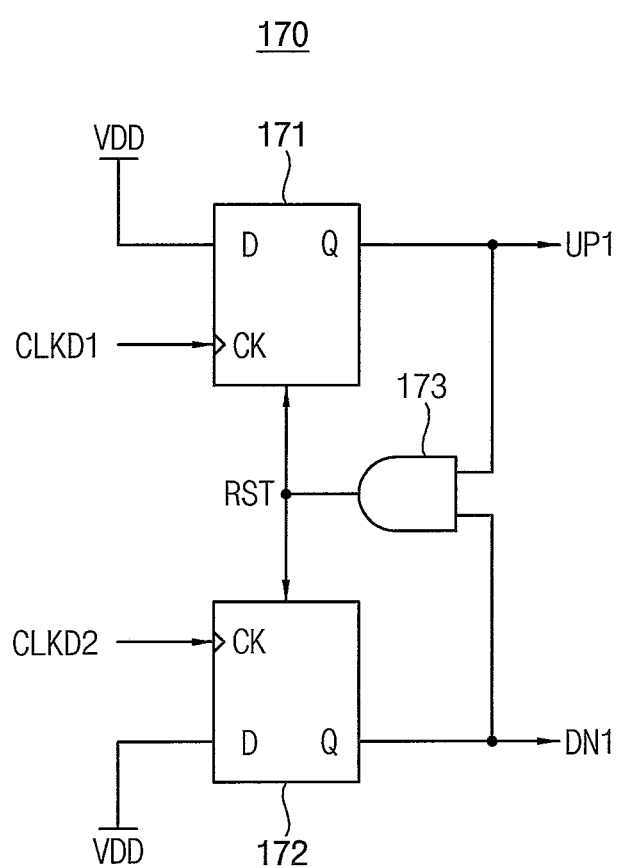
FIG. 6 is a circuit diagram illustrating an example of the phase/frequency detector in the VTC of FIG. 2, according to example embodiments.

FIG. 6 is a circuit diagram illustrating an example of the phase/frequency detector in the VTC of FIG. 2 according to example embodiments. Referring to FIG. 6, the phase/frequency detector 170 may include a first flip-flop 171, a second flip-flop 172 and an AND gate 173. The first flip-flop 171 may be synchronized with the first delayed clock signal CLKD1. Similarly, the second flip-flop 172 may be synchronized with the second delayed clock signal CLKD2. In addition, a data input D of each of the first and second flip-flops 171 and 172 may be connected to the power supply voltage VDD. That is, the data input D may be connected to a fixed logic "1". The first flip-flop 171 may output an output Q as logic "1" at a rising edge of the first delayed clock signal CLKD1. Similarly, the second first flip-flop 172 may output an output Q as logic "1" at a rising edge of the second clock signal CKKD2. The output Q of the first flip-flop 171 may become an up signal UP1 and the output Q of the second flip-flop 172 may become a down signal DN1. The AND logic 173 performs an AND operation on the output Q of the first flip-flop 171 and the output Q of the second flip-flop 172 and may output a reset signal RST. The reset signal RST may be provided to the first and second flip-flops 171 and 172.

When a phase of the first delayed clock signal CLKD1 is earlier than a phase of the second delayed clock signal CLKD2, the up signal UP1 may become logic "1" from the rising edge of first delayed clock signal CLKD1 and may become logic "0" from the rising edge of the second delayed clock signal CLKD2. Similarly, when a phase of the second delayed clock signal CLKD2 is earlier than a phase of the first delayed clock signal CLKD1, the down signal DN1 may become logic "1" from the rising edge of second delayed clock signal CLKD2 and may become logic "0" from the rising edge of the first delayed clock signal CLKD1.

Figure 7:
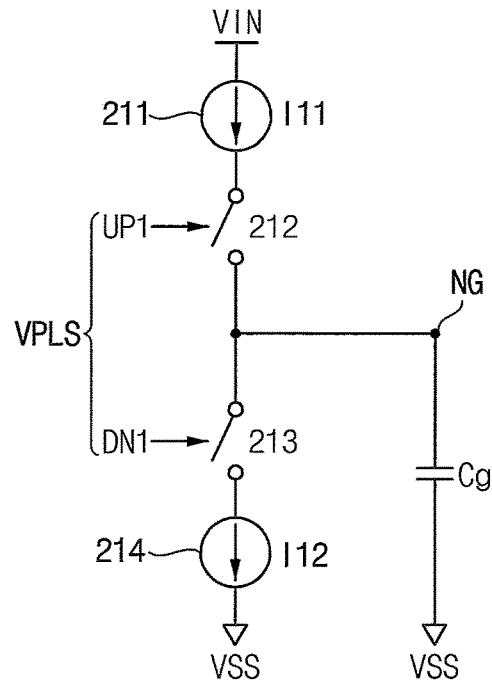
FIG. 7 is a circuit diagram illustrating an example of the driving TIC in the LDO regulator of FIG. 1, according to example embodiments.

FIG. 7 is a circuit diagram illustrating an example of the driving TIC in the LDO regulator of FIG. 1, according to example embodiments. Referring to FIG. 7, a driving TIC 210a may include a first current source 211 connected to the input voltage VIN, a first switch 212, a second switch 213 and a second current source 214 connected to the ground voltage VSS. The first current source 211 may generate a first current I11 based on the input voltage VIN. The second current source 214 may provide a second current I12 to the ground voltage VSS.

In addition, the first switch 212 may be connected between the first current source 211 and the gate node NG. The first switch 212 may be turned-on to provide the gate node NG with the first current I11 from the first current source 211 in response to an up signal UP1 corresponding to the voltage pulse signal VPLS having an on-time corresponding to the first pulse width, if the output voltage VOUT is greater than the reference voltage VREF. When the first current I11 is provided to the gate node NG, a current provided to the output node NO from the input voltage VIN decreases and thus, a voltage level of the output voltage VOUT deceases.

The second switch 213 may be connected between the gate node NG and the second current source 214. The second switch 213 may be turned-on to discharge the gate node NG to the ground voltage VSS in response to a down signal DN1 corresponding to the voltage pulse signal VPLS having an on-time corresponding to the first pulse width, if the output voltage VOUT is smaller than the reference voltage VREF. When the gate node NG is discharged to the ground voltage VSS, the gate voltage VG at the gate node NG decreases, a current provided to the output node NO from the input voltage VIN increases and thus, a voltage level of the output voltage VOUT increases.

Figure 8:
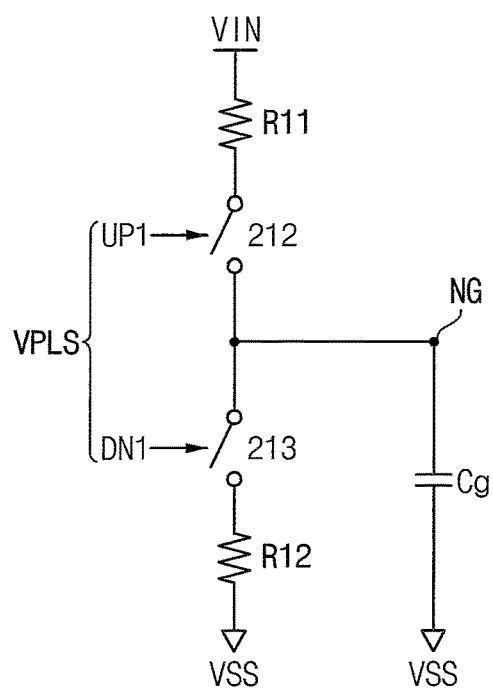
FIG. 8 is a circuit diagram illustrating an example of the driving TIC in the LDO regulator of FIG. 1, according to example embodiments.

FIG. 8 is a circuit diagram illustrating an example of the driving TIC in the LDO regulator of FIG. 1, according to example embodiments. Referring to FIG. 8, a driving TIC 210b may include a first resistor R11 connected to the input voltage VIN, a first switch 212, a second switch 213 and a second resistor R12 connected to the ground voltage VSS. The first switch 212 may be connected between the first resistor R11 and the gate node NG. The first switch 212 may be turned-on to provide the gate node NG with a current based on the input voltage VIN in response to an up signal UP1, if the output voltage VOUT is greater than the reference voltage VREF. The second switch 213 may be connected between the gate node NG and the second resistor R12. The second switch 213 may be turned-on to discharge the gate node NG to the ground voltage VSS in response to a down signal DN1 if the output voltage VOUT is smaller than the reference voltage VREF and may connect the gate node NG to the ground voltage VSS via the second resistor R12.

Figure 9:
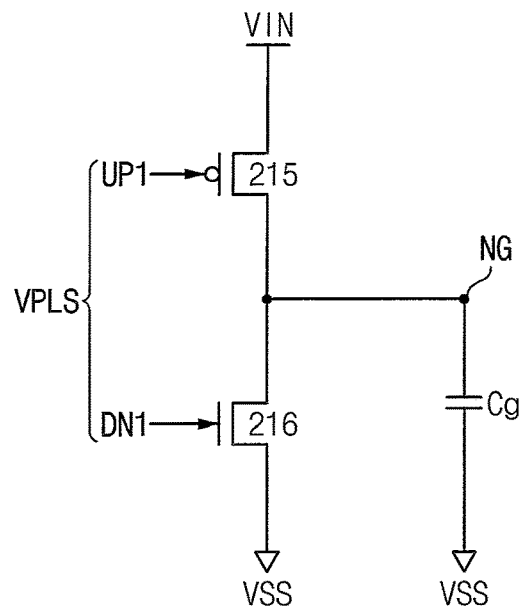
FIG. 9 is a circuit diagram illustrating an example of the driving TIC in the LDO regulator of FIG. 1, according to example embodiments.

FIG. 9 is a circuit diagram illustrating an example of the driving TIC in the LDO regulator of FIG. 1, according to example embodiments. Referring to FIG. 9, a driving TIC 210c may include a PMOS transistor 215 connected between the input voltage VIN and the gate node NG, and an NMOS transistor 216 connected between the gate node NG the ground voltage VSS.

The PMOS transistor 215 may be turned-on to provide the gate node NG with a current based on the input voltage VIN in response to an up signal UP1 if the output voltage VOUT is greater than the reference voltage VREF. The NMOS transistor 216 may be turned-on to connect the gate node NG to the ground voltage VSS in response to a down signal DN1 if the output voltage VOUT is smaller than the reference voltage VREF.

Figure 10:
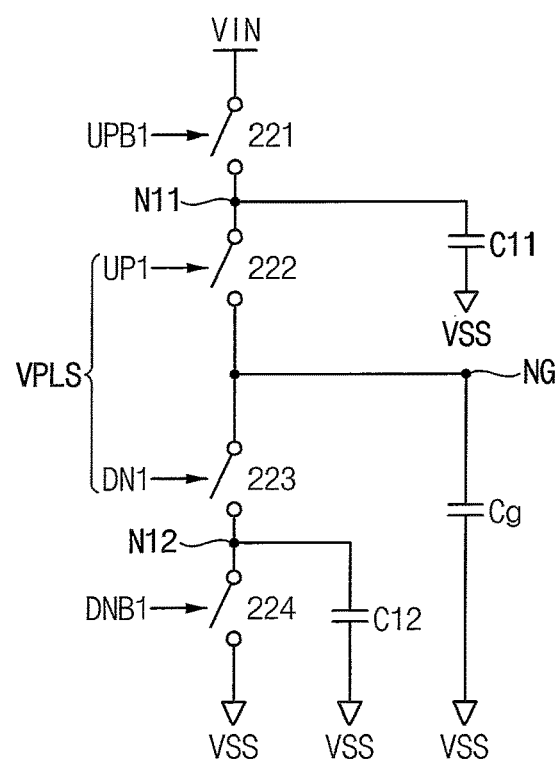
FIG. 10 is a circuit diagram illustrating an example of the driving TIC in the LDO regulator of FIG. 1, according to example embodiments.

FIG. 10 is a circuit diagram illustrating an example of the driving TIC in the LDO regulator of FIG. 1, according to example embodiments. Referring to FIG. 10, a driving TIC 210d may include a first switch 221, a second switch 222, a first capacitor C11, a third switch 223, a fourth switch 224 and a second capacitor C12. The first capacitor C11 may be coupled between a first node N11 and the ground voltage VSS and the second capacitor C12 may be coupled between a second node N12 and the ground voltage VSS.

The first switch 221 may be connected between the input voltage VIN and the first node N11, may be switched in response to an inverted version UPB1 of the up-signal UP1, may be turned-on, and may provide a current based on the input voltage VIN to the first node N11 to charge the first capacitor C11. The second switch 222 may be connected between the first node N11 and the gate node NG, may be switched in response to the up signal UP1, and may be turned-on in response to the up signal UP1 if the output voltage VOUT is greater than the reference voltage VREF, to thereby provide the gate node NG with a current corresponding to a voltage charged in the first capacitor C11.

The third switch 223 may be connected between the gate node NG and the second node N12, may be switched in response to the down-signal DN1, and may be turned-on in response to the down signal DN1 if the output voltage VOUT is smaller than the reference voltage VREF to transfer charges in the charging capacitor Cg to the second capacitor C12. The fourth switch 224 may be connected between the second node N12 and the ground voltage VSS, may be switched in response to an inverted version DNB1 of the down-signal DN1 and may be turned-on in response to the inverted version DNB1 to discharge the second capacitor C12.

Figure 11:
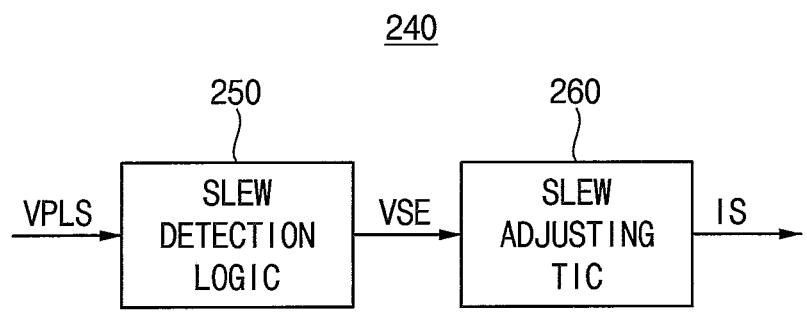
FIG. 11 is a block diagram illustrating an example of the slew adjusting circuit in the LDO regulator of FIG. 1, according to example embodiments.

FIG. 11 is a block diagram illustrating an example of the slew adjusting circuit in the LDO regulator of FIG. 1, according to example embodiments. Referring to FIG. 11, the slew adjusting circuit 240 may include a slew detection logic 250 and a slew adjusting TIC 260. The slew detection logic 250 may receive the voltage pulse signal VPLS, and may detect that the first pulse width of the voltage pulse signal VPLS is equal to or greater than a reference time interval during a switching period of the LDO regulator 10 and may generate a slew detection signal VSE having a second pulse width corresponding a difference between the first pulse width and the reference time interval. In contrast, the slew adjusting TIC 260 may receive the slew detection signal VSE and may provide the gate node NG with the slew adjusting current IS, which is proportional to the second pulse width of the slew detection signal VSE.

Figure 12:
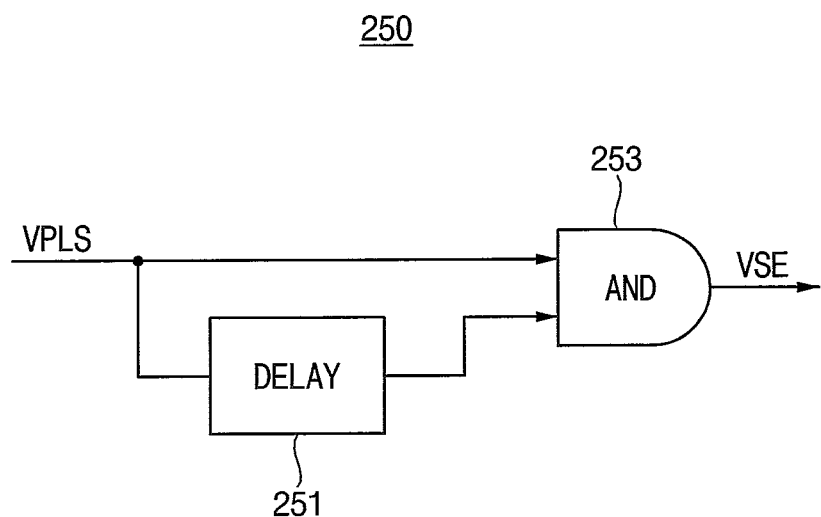
FIG. 12 is a block diagram illustrating an example of the slew detection logic in the slew adjusting circuit of FIG. 11, according to example embodiments.

FIG. 12 is a block diagram illustrating an example of the slew detection logic in the slew adjusting circuit of FIG. 11, according to example embodiments. Referring to FIG. 12, the slew detection logic 250 may include a delay circuit, DELAY 251, and an AND gate 253. The delay circuit 251 may delay the voltage pulse signal VPLS by a first delay amount. The AND gate 253 may perform an AND operation on the voltage pulse signal VPLS and an output of the delay circuit 251 to output the slew detection signal VSE. The first delay amount of the delay circuit 251 may correspond to the reference time interval.

Figure 13:
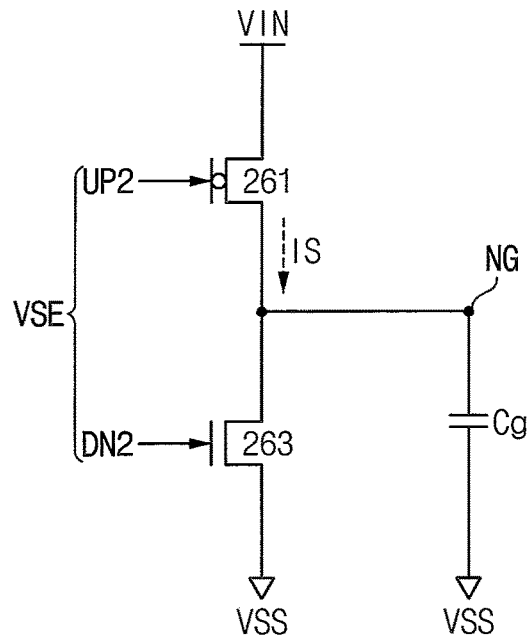
FIG. 13 is a circuit diagram illustrating an example of the slew adjusting TIC in the slew adjusting circuit of FIG. 11, according to example embodiments.

FIG. 13 is a circuit diagram illustrating an example of the slew adjusting TIC in the slew adjusting circuit of FIG. 11, according to example embodiments. Referring to FIG. 13, the slew adjusting TIC 260 may include a PMOS transistor 261 connected between the input voltage VIN and the gate node NG and an NMOS transistor 263 connected between the gate node NG and the ground voltage VSS.

The PMOS transistor 261 may be turned-on to provide the gate node NG with the slew adjusting current IS based on the input voltage VIN in response to an up signal UP2 corresponding to the slew detection signal VSE having an on-time corresponding to the second pulse width, which corresponds to a difference between the first pulse width and the reference time interval, if: (i) the output voltage VOUT is greater than the reference voltage VREF, and (ii) the first pulse width is equal to or greater than the reference time interval.

The NMOS transistor 263 may be turned-on to connect the gate node NG to the ground voltage VSS in response to a down signal DN2 corresponding to the slew detection signal VSE having an on-time corresponding to the second pulse width, which corresponds to a difference between the first pulse width and the reference time interval, if: (i) the output voltage VOUT is smaller than the reference voltage VREF, and (ii) the first pulse width is equal to or greater than the reference time interval. The turned-on NMOS transistor 263 may draw a current corresponding to the slew adjusting current IS from the gate node NG. When a difference between the output voltage VOUT and the reference voltage VREF is significant in a transient operation, the slew adjusting TIC 260 detects a case in which the difference between the output voltage VOUT and the reference voltage VREF is large and draws a current corresponding to the slew adjusting current IS from the gate node NG and drives the gate of the pass transistor 311 to reduce the gate voltage VG quickly.

In some embodiments, the slew adjusting TIC 260 may be implanted with a charge pump similar with the driving TIC 210a of FIG. 7, the driving TIC 210b of FIG. 8 or the driving TIC 210d of FIG. 10.

Figure 14:
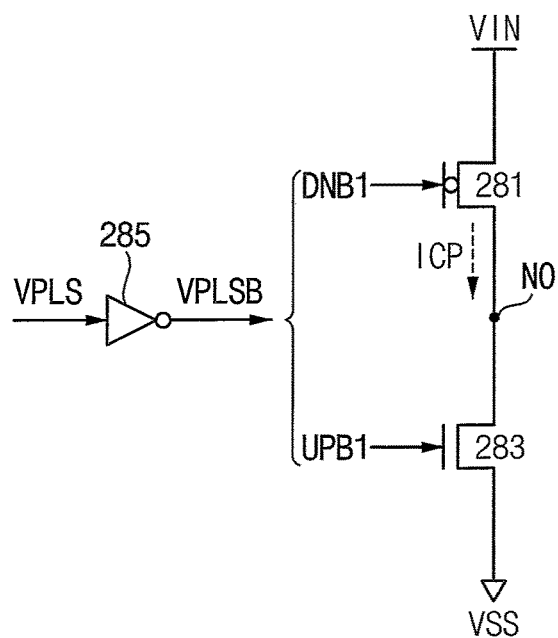
FIG. 14 is a circuit diagram illustrating an example of the compensation TIC in the LDO regulator of FIG. 1, according to example embodiments.

FIG. 14 is a circuit diagram illustrating an example of the compensation TIC in the LDO regulator of FIG. 1, according to example embodiments. Referring to FIG. 14, the compensation TIC 280 may include a PMOS transistor 281 connected between the input voltage VIN and the output node NO, an NMOS transistor 283 connected between the output node NO and the ground voltage VSS and an inverter 285.

The inverter 285 may invert the voltage pulse signal VPLS to output an inverted voltage pulse signal VPLSB. The NMOS transistor 283 may be turned-on to connect the output node NO to the ground voltage VSS in response to an inverted up signal UPB having an on-time corresponding to the first pulse width, if the output voltage VOUT is greater than the reference voltage VREF, and may discharge the output node NO to the ground voltage VSS to decrease a voltage level of the output voltage VOUT at the output node NO.

The PMOS transistor 281 may be turned-on to provide the gate node NG with the compensation current ICP based on the input voltage VIN in response to an inverted down signal DN2 having an on-time corresponding to the first pulse width, if the output voltage VOUT is smaller than the reference voltage VREF to increase a voltage level of the output voltage VOUT at the output node NO.

In some embodiments, the compensation TIC 280 may be implanted with a charge pump similar with the driving TIC 210a of FIG. 7, the driving TIC 210b of FIG. 8 or the driving TIC 210d of FIG. 10.

FIG. 15 is a timing diagram illustrating operation of the VTC in the LDO regulator of FIG. 1, according to example embodiments. Referring to FIGS. 1-5 and FIG. 15, the VTC 100 generates the voltage pulse signal VPLS having an amplitude with a sign of (−1) and pulse widths Δt1, Δt2 and Δt3 which correspond to difference between the output voltage VOUT and the reference voltage VREF between timings T0, T1, T2 and T3 in each of which the VOUT is smaller than the reference voltage VREF as the down signal DN1. The pulse width Δt1 is greater than the pulse width Δt2 and the pulse width Δt2 is greater than the pulse width Δt3.

In addition, the VTC 100 generates the voltage pulse signal VPLS having an amplitude with a sign of (+1) and pulse widths which correspond to difference between the output voltage VOUT and the reference voltage VREF between timings T3, T4, T5 and T6 in each of which the VOUT is greater than the reference voltage VREF as the up signal DN1.

In addition, the VTC 100 generates the voltage pulse signal VPLS having an amplitude corresponding to zero between timings T6, T7 and T8 in each of which the VOUT is substantially the same as the reference voltage VREF.

Figure 16:
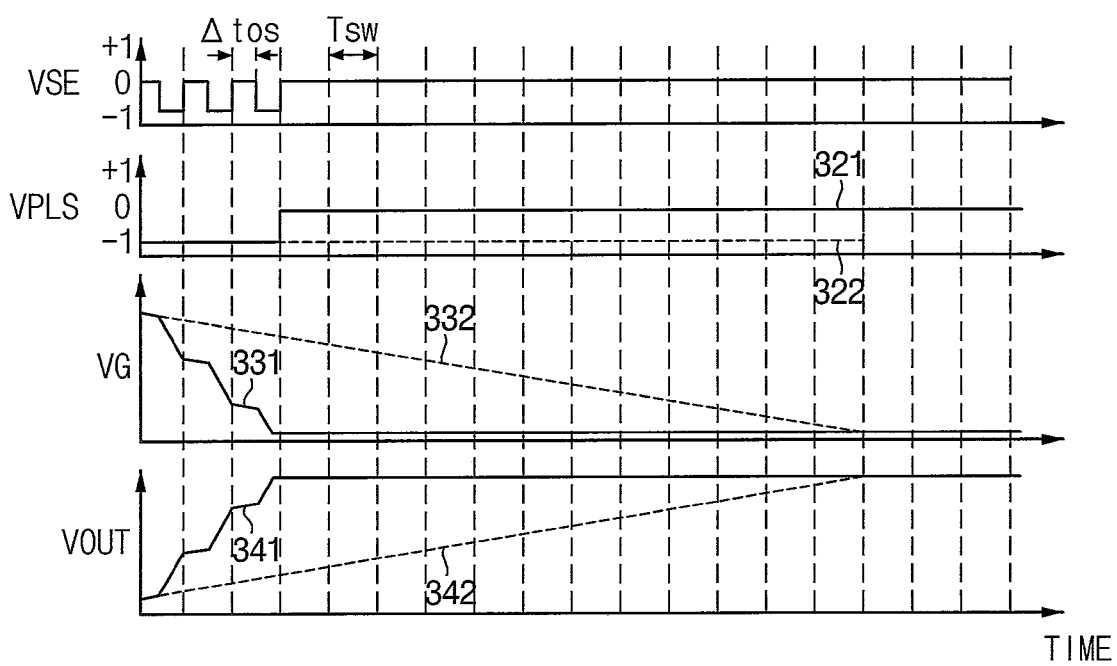
FIG. 16 illustrates operation of the slew adjusting circuit of FIG. 11, according to example embodiments.

FIG. 16 illustrates operation of the slew adjusting circuit of FIG. 11, according to example embodiments. In FIG. 16, it is assumed that the output voltage VOUT is smaller than the reference voltage VREF. Referring to FIGS. 11 through 13 and 16, as a reference numeral 321 indicates, the slew detection logic 250 may detect that the first pulse width (having (−1) sign) of the voltage pulse signal VPLS is equal to or greater than a reference time interval $\Delta t_{OS}$ during a switching period $T_{SW}$ of the LDO regulator 10, and may generate the slew detection signal VSE having a second pulse width, which corresponds a difference between the first pulse width and the reference time interval $\Delta t_{OS}$ and has a (−1) sign, and may provide the slew detection signal VSE to the slew adjusting TIC 260.

As described with reference to FIG. 13, the slew adjusting TIC 260 may discharge the gate node NG in response to the slew detection signal VSE corresponding to the down signal DN2 to decrease the gate voltage VG at the gate node NG quickly as a reference numeral 331 indicates. When the gate voltage VG at the gate node NG decreases quickly, the pass transistor 311 provides the output node NO with a current based on the input voltage VIN and thus, a voltage level of the output voltage VOUT at the output node NO increases quickly as a reference numeral 341 indicates. That is, slew rate of the output voltage VOUT increases (enhanced).

In FIG. 16, reference numerals 322, 332 and 342 denotes the voltage pulse signal VPLS, the gate voltage VG and the output voltage VOUT, respectively when the slew adjusting circuit 240 is not included in the LDO regulator 10 of FIG. 1. As the reference numerals 322, 332 and 342 indicate, if the slew adjusting circuit 240 is not included in the LDO regulator 10, the slew detection logic 250 does not detect that the first pulse width (having (−1) sign) of the voltage pulse signal VPLS is equal to or greater than the reference time interval $\Delta t_{OS}$, may not reduce the gate voltage VG quickly and thus the output voltage VOUT arrives at a target level slowly.

Figure 17:
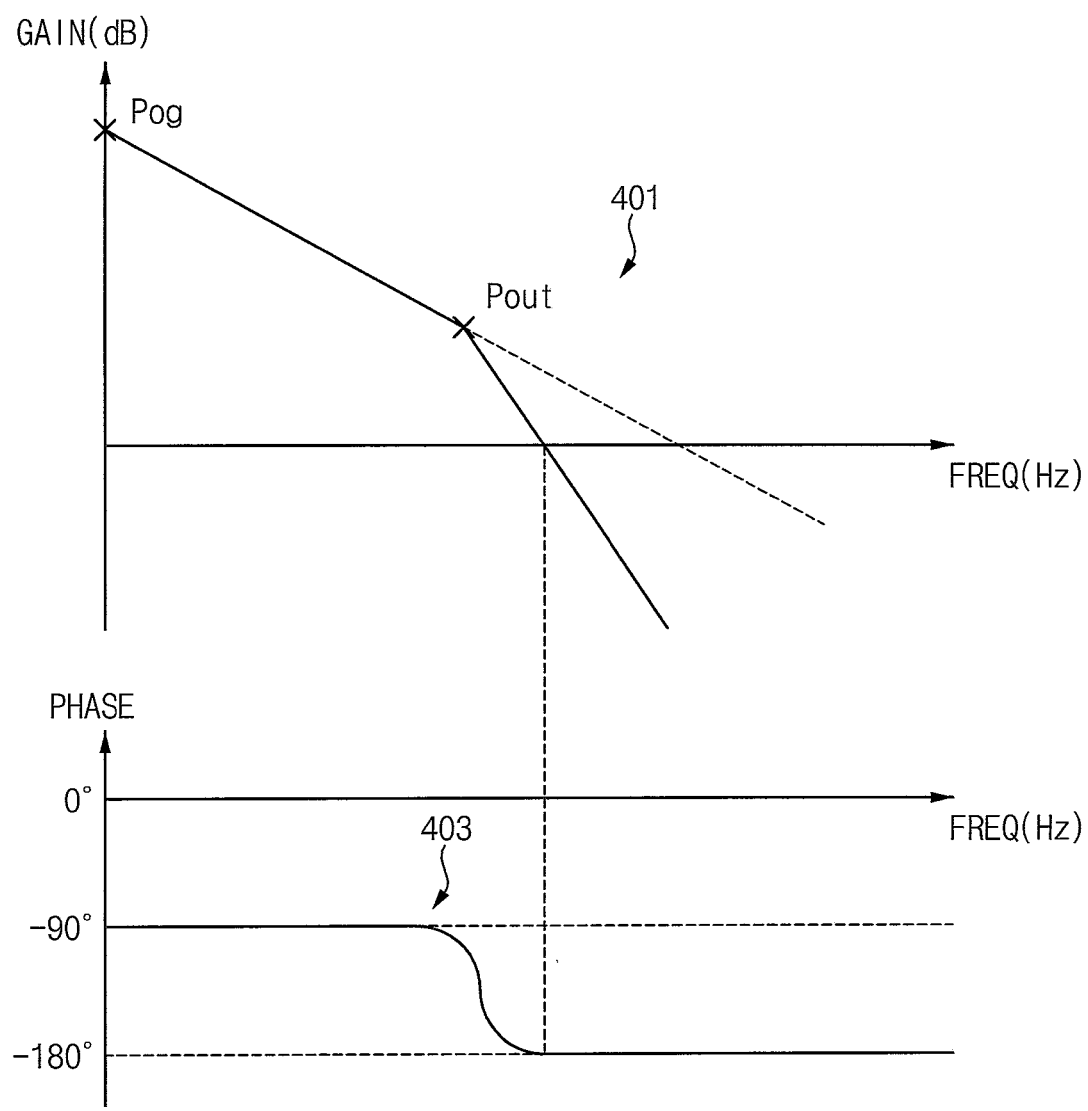
FIG. 17 is a graph for explaining a transfer function of the LDO regulator of FIG. 1 when the LDO regulator does not include the compensation TIC.

FIG. 17 is a graph for explaining a transfer function of the LDO regulator of FIG. 1 when the LDO regulator does not include the compensation TIC. In FIG. 17, a horizontal axis represents frequency (Hz) and a vertical axis represents a gain of a transfer function in a graph 401. In addition, a horizontal axis represents frequency (Hz) and a vertical axis represents a phase of the transfer function in a graph 403.

In FIG. 17, assuming that the LDO regulator 10 of FIG. 1 does not include the compensation TIC 280 and the load resistor RL consumes great current. Referring to FIG. 17, the transfer function may include an original pole, Pog, and an output pole, Pout. The original pole, Pog, may be generated when the driving TIC 210, with a charge pump configuration, drives the pass transistor 311, and the output pole Pout may be associated with the load resistor RL and the load capacitor CL connected to the output node NO. A frequency of the output pole Pout is smaller than a cut off frequency at which the gain is 0 dB and a phase at the cut off frequency is −180 degree which is unstable.

Figure 18:
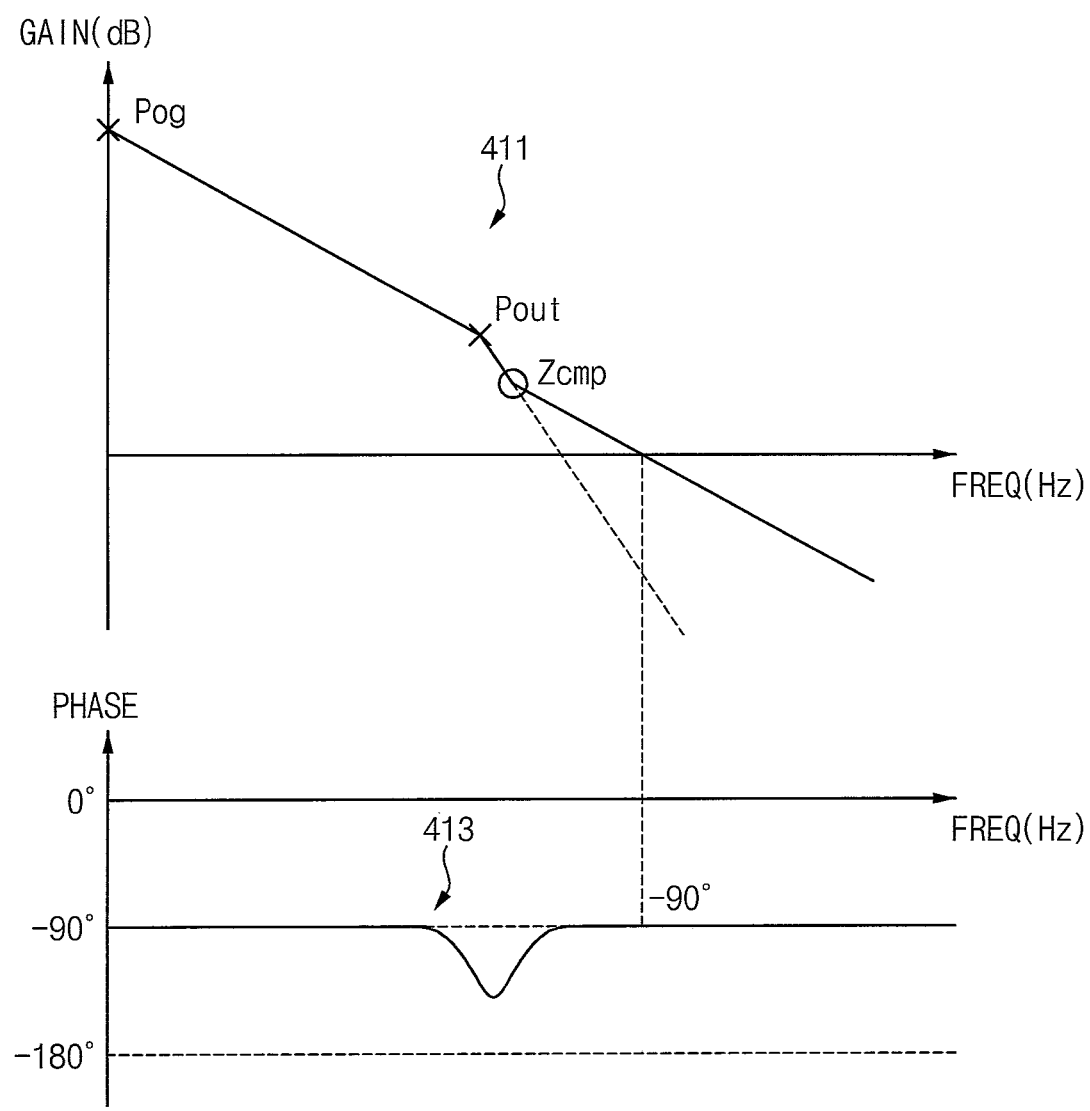
FIG. 18 is a graph for explaining a transfer function of the LDO regulator of FIG. 1, according to example embodiments.

FIG. 18 is a graph for explaining a transfer function of the LDO regulator of FIG. 1, according to example embodiments. In FIG. 18, a horizontal axis represents frequency (Hz) and a vertical axis represents a gain of a transfer function in a graph 411. In addition, a horizontal axis represents frequency (Hz) and a vertical axis represents a phase of the transfer function in a graph 413.

In FIG. 18, assume the LDO regulator 10 of FIG. 1 includes the compensation TIC 280 and the load resistor RL consumes significant current. In this case, the transfer function may include an original pole, Pog, an output pole, Pout, and a compensation zero Zcmp. The original pole, Pog, may be generated when the driving TIC 210, with a charge pump configuration, drives the pass transistor 311. The output pole, Pout, may be associated with the load resistor RL and the load capacitor CL connected to the output node NO, and the compensation zero, Zcmp, may be associated with the VTC and the compensation TIC 280, which constitutes a frequency compensation loop. A frequency of the output pole, Pout, is smaller than a cut off frequency at which the gain is 0 dB and a phase at the cut off frequency is −90 degree which is stable.

A transfer function $T_M$ of a main loop including the VTC 100, the driving TIC 210 and the pass transistor 311 in the LDO regulator 10 of FIG. 1 may be represented following Equation 1:

$$T_M = \frac{A_{V\_M}}{s(1+s/P_{out})}$$

In Equation 1, $A_{V\_M}$ indicates a gain of a main loop, including the VTC 100, the driving TIC 210 and the pass transistor 311, and Pout indicates an output pole.

A transfer function $T_C(s)$ of a frequency compensation loop, including the VTC 100 and the compensation TIC 280 in the LDO regulator 10 of FIG. 1, may be represented following Equation 2:

$$T_C(s) = \frac{A_{V\_C}}{(1+s/P_{out})}$$

In Equation 2, $A_{V\_C}$ indicates a gain of a frequency compensation loop including the VTC 100 and the compensation TIC 280.

A total transfer function $T_{tot}(s)$ of the LDO regulator 10 of FIG. 11 may be represented following Equation 3:

$$T_{tot}(s) = T_M(s) + T_C(s) = \frac{A_{V\_M}}{s(1+s/P_{out})} + \frac{A_{V\_C}}{(1+s/P_{out})} = \frac{A_{V\_M} + sA_{V\_C}}{s(1+s/P_{out})} = \frac{A_{V\_M}\left(1+s\frac{A_{V\_C}}{A_{V\_M}}\right)}{s(1+s/P_{out})}$$

In Equation 3, $A_{V\_M}/A_{V\_C}$ may correspond to the compensation zero Zcmp.

The LDO regulator 10 drives the output node digitally by converting a difference between the input voltage and the output voltage to reduce a voltage "headroom" associated with an analog LDO regulator, and may maintain a level of the output voltage VOUT even if the load current changes abruptly by employing the slew adjusting circuit 240, and may increase stability even if the load current is small by employing the compensation TIC 280.

Figure 19:
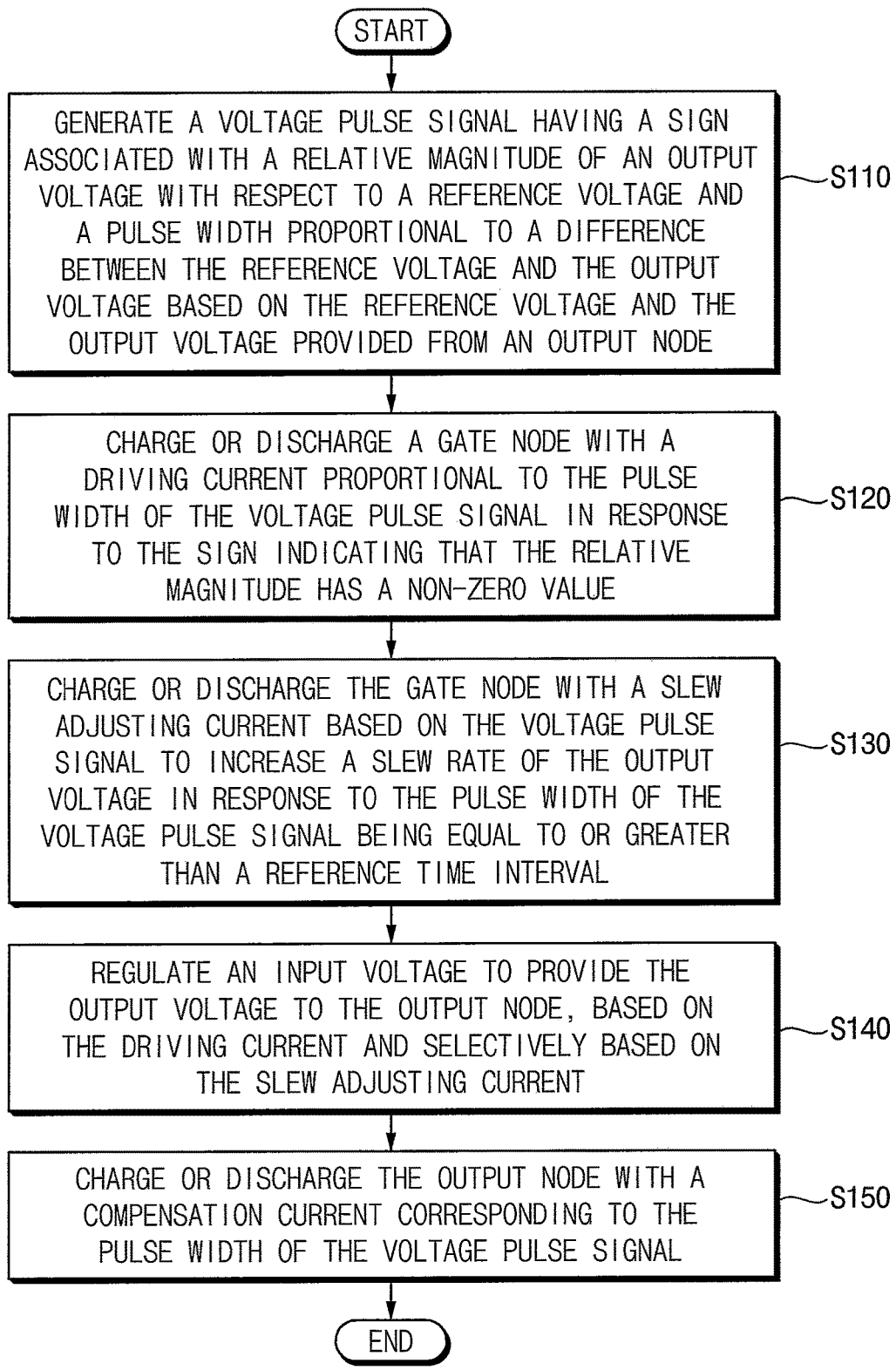
FIG. 19 is a flow chart illustrating an operation of the LDO regulator, according to example embodiments.

FIG. 19 is a flow chart illustrating an operation of the LDO regulator according to example embodiments. Referring to FIGS. 1 through 16 and 19, the VTC 100 may receive the reference voltage VREF and an output voltage VOUT provided from an output node NO to generate a voltage pulse signal VPLS having a sign and a first pulse width based on a difference between the reference voltage VREF and the output voltage VOUT (operation S110). The sign may be associated with a relative magnitude of the output voltage VOUT with respect to the reference voltage VREF and the first pulse width may be proportional to a difference between the reference voltage VREF and the output voltage VOUT. The driving TIC 210 may charge or discharge the gate node NG with a driving current IDR proportional to the first pulse width of the voltage pulse signal VPLS in response to the sign indicating that the relative magnitude has a non-zero value (operation S120).

The slew adjusting circuit 240 may be activated in response to the first pulse width of the voltage pulse signal VPLS being equal to or greater than a reference time interval and may charge or discharge the gate node NG with a slew adjusting current IS based on the voltage pulse signal VPLS to increase a slew rate of the output voltage VOUT (operation S130). The pass transistor 311 may regulate the input voltage VIN to provide the output voltage VOUT to the output node NO by regulating the input voltage VIN, based on the driving current IDR and selectively based on the slew adjusting current IS (operation S140). The compensation TIC 280 may receive the voltage pulse signal VPLS, may generate a compensation current ICP corresponding to the first pulse width of the voltage pulse signal VPLS and may charge or discharge the output node NO with the compensation current ICP. The compensation TIC 280 charge or discharge the output node NO with a compensation current ICP corresponding to the first pulse width of the voltage pulse signal VPLS (operation S150).

Figure 20:
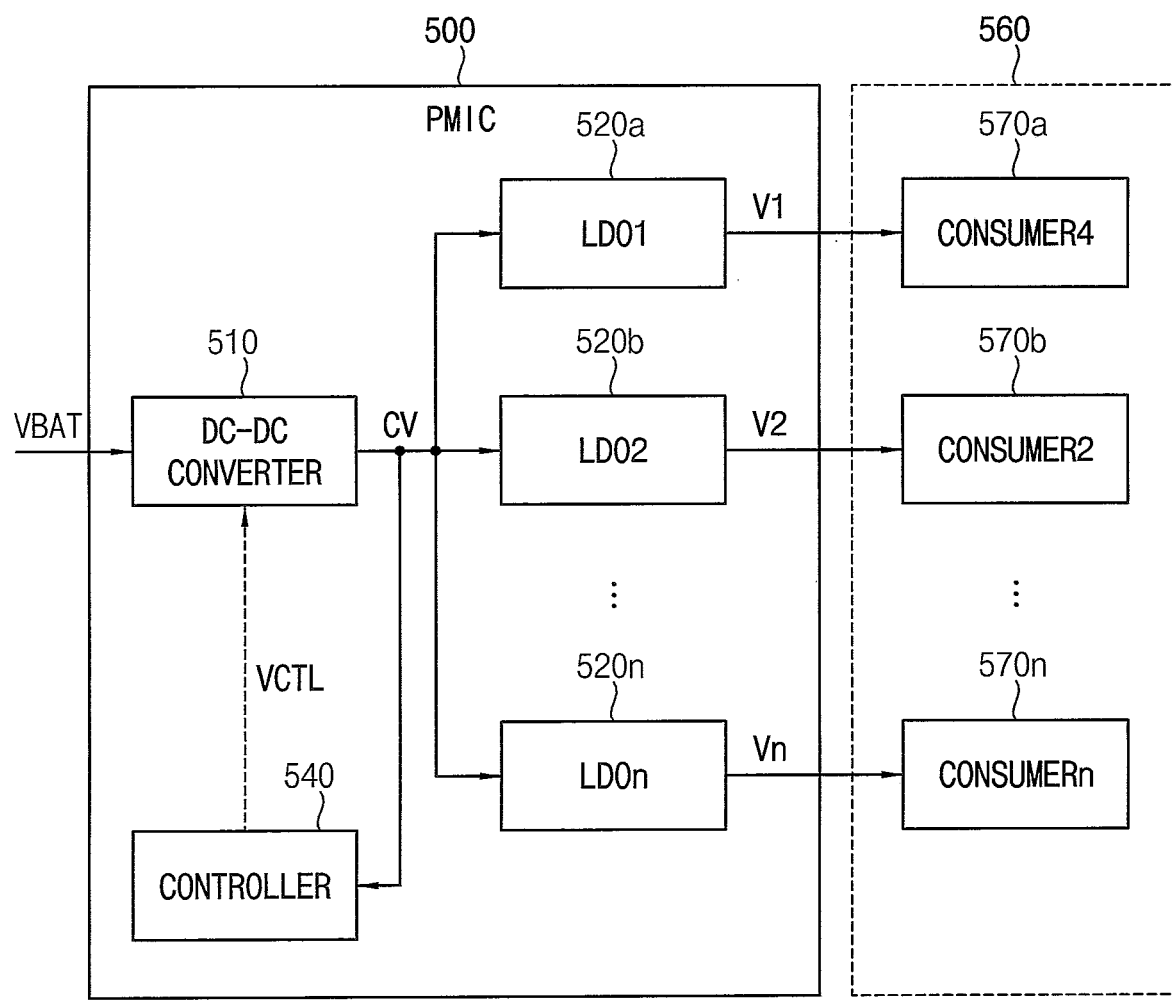
FIG. 20 is a block diagram illustrating an example of an electronic device including a power management integrated circuit (PMIC), according to example embodiments.

FIG. 20 is a block diagram illustrating an example of an electronic device including a power management integrated circuit (PMIC), according to example embodiments. Referring to FIG. 20, an electronic device 20 may include a PMIC 500 and a consumer group 560. The consumer group 560 may include a plurality of consumers 570a through 570n. In an embodiment, the consumers 570a through 570n may be chips, modules, or other circuits in the electronic device 20.

For example, the consumers 570a through 570n may be modems, application processors, memories, displays, and/or other circuits. The consumers 570a through 570n may also include operation blocks, functional blocks, or IP blocks in the electronic device 230. Examples of these include multimedia blocks, memory controllers, or other logic in the application processor. The consumers 570a through 570n may be referred to, for example, as consumption blocks or loads.

The PMIC 500 may receive a battery voltage VBAT from a source (e.g., an external source) and generate a plurality of output voltages V1 through Vn for driving the consumers 570a through 570n. The PMIC 500 may include at least one first regulator 510, a plurality of second regulators 520a through 520n, and a controller 140. The at least one first regulator 510 and the second regulators 520a through 520n may be connected to each other, for example, in a multistep structure.

The first regulator 510 may receive the battery voltage VBAT from an external voltage source, for example, a battery, and generate a conversion voltage CV from the received battery voltage VBAT. The first regulator 510 may adjust switching timing associated with the conversion voltage CV based on a voltage control signal VCTL.

In an embodiment, when at least one of the consumers 570a through 570n is powered off (and thus at least one of the second regulators 520a through 520n is powered off), the conversion voltage CV may be reduced. In an embodiment, although all the consumers 570a through 570n are powered on, the conversion voltage CV may also be changed according to the operation states of the consumers 570a through 570n. For example, when one of the consumers 570a through 570n is in a standby or sleep state (and thus an output current of a corresponding one of the consumers 570a through 570n is reduced), the conversion voltage CV may be reduced.

In an embodiment, the first regulator 510 may be a switching regulator that uses an energy storage component (e.g., a capacitor and an inductor) and an output stage to generate the conversion voltage CV. For example, the first regulator 510 may be a DC-DC converter. The first regulator 510 is referred to as the DC-DC converter below. The DC-DC converter 510 may be a step-up converter (for example, a boost converter) that coverts the low battery voltage VBAT to the high conversion voltage CV, or a step-down converter (for example, a buck converter) that converts the high battery voltage VBAT to the low conversion voltage CV.

The second regulators 520a through 520n may be commonly connected to the DC-DC converter 510, receive the conversion voltage CV from the DC-DC converter 110, and generate a plurality of output voltages V1 through Vn from the conversion voltage CV. The output voltages V1 through Vn may be different from each other and, for example, may be less than the conversion voltage CV. The second regulators 520a through 520n may be, for example, linear regulators, e.g., LDO regulators. For illustrative purposes, the second regulators 520a through 520n are referred to as the LDO regulators below.

The DC-DC converter 510 may have a substantially uniform efficiency irrespective of input and output voltages. Each of the LDO regulators 520a through 520n may have a variable efficiency with respect to the input and output voltages. Efficiency of each of the LDO regulators 520a through 520n may correspond to a ratio of each of the output voltages V1 through Vn with respect to the conversion voltage VC. For example, the efficiency of the LOD regulator 520a may be a ratio (e.g., V1/Vout) of the output voltage V1 with respect to the conversion voltage CV. Thus, a reduction in the difference between the input and output voltages of the LDO regulators 520a through 520n may be performed to improve the efficiency of each of the LDO regulators 520a through 520n.

When the difference between the input and output voltages of LDO regulators 520a through 520n is large (e.g., above a predetermined level), the conversion efficiency of the entire PMIC 500 may be improved when the DC-DC converter 510 is in front of the LDO regulators 520a through 520n and an output of the DC-DC converter 510 is used as an input of each of the LDO regulators 520a through 520n. Thus, for example, when the output voltages V1 through Vn of the LDO regulators 520a through 520n are different from each other, the conversion efficiency of the PMIC 500 may be improved when DC-DC converters are respectively arranged in front of the LDO regulators 520a through 520n.

In one embodiment, the LDO regulators 520a through 520n may be grouped, and the DC-DC converter 510 may be shared by the grouped LDO regulators 520a through 520n, in order to reduce the area and manufacturing costs of the PMIC 500. In this case, the difference between the input and output voltages of the LDO regulators 520a through 520n may be large (e.g., above a predetermined level) compared when the LDO regulators 520a through 520n and DC-DC converters are respectively arranged. Thus, the conversion efficiency of the PMIC 500 may be reduced. However, according to the present embodiment, the first regulator 510 may adjust the switching timing associated with the conversion voltage CV based on the voltage control signal VCTL, thereby improving the conversion efficiency of the PMIC 500.

The controller 540 may generate the voltage control signal VCTL for adjusting the switching timing associated with the conversion voltage CV output from the DC-DC converter 510. The voltage control signal VCTL may be provided to the DC-DC converter 510. Each of the LDO regulators 520a through 520n may employ the LDO regulator 10 of FIG. 1. Therefore, each of the LDO regulators 520a through 520n may receive a reference voltage and an output voltage provided from an output node, may generate a voltage pulse signal having a sign associated with a relative magnitude of the output voltage VOUT with respect to the reference voltage and a first pulse width proportional to a difference between the reference voltage and the output voltage based on a difference between the reference voltage and the output voltage, may charge or discharge the gate node with a driving current corresponding to the first pulse width, may selectively discharge the gate node with a slew adjusting current based on the voltage pulse signal if the first pulse width is greater than a reference time interval to increase slew rate of the output voltage and may provide the output node with a compensation current corresponding to the first pulse width to enhance frequency characteristic of each of the LDO regulators 520a through 520n.

Figure 21:
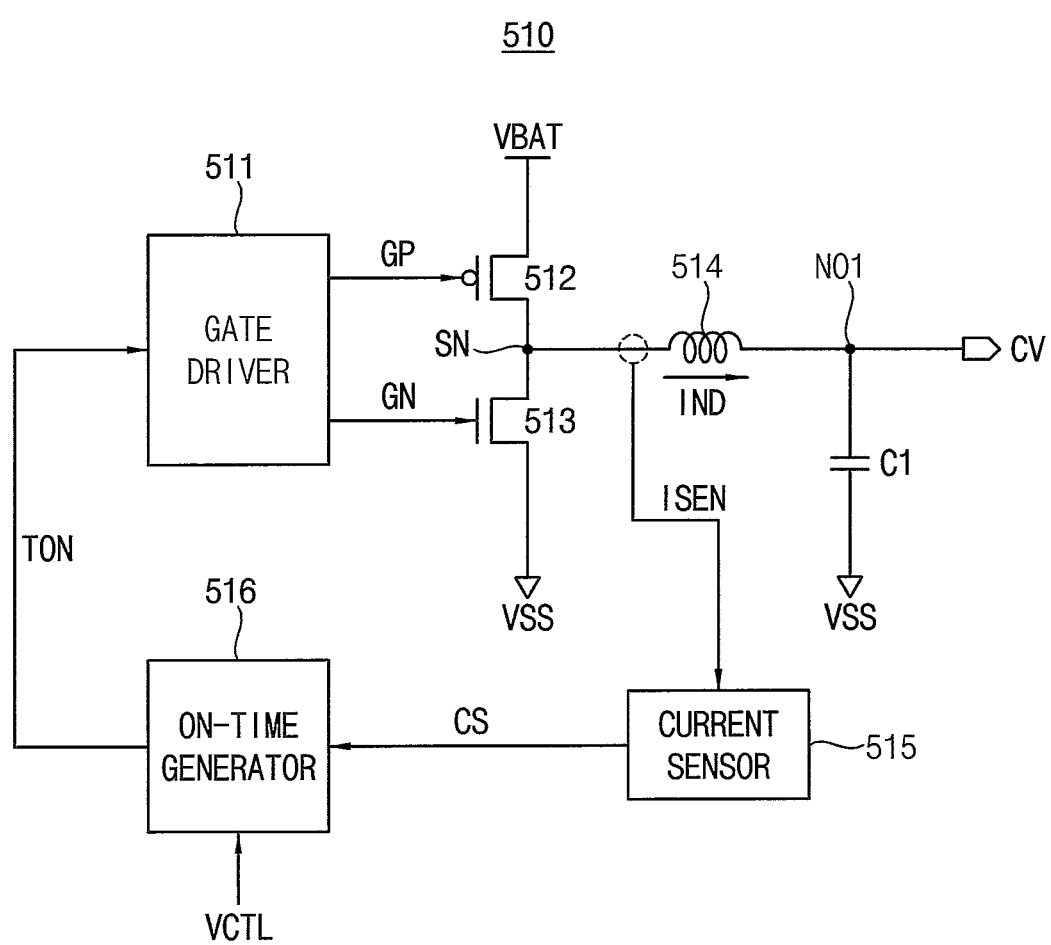
FIG. 21 is a circuit diagram illustrating an example of the DC-DC converter in FIG. 20, according to example embodiments.

FIG. 21 is a circuit diagram illustrating an example of the DC-DC converter in FIG. 20, according to example embodiments. Referring to FIG. 21, the DC-DC converter (the switching regulator) 510 may include a gate driver 511, a first driving transistor 512, a second driving transistor 513, an inductor 514, a capacitor C1, a current sensor 515 and an on-time generator 516.

The first driving transistor 512 is connected between the battery voltage VBAT and a switching node SN and has a gate receiving a first driving control signal GP1. The first driving transistor 512 may be a PMOS transistor. The second driving transistor 513 is connected between the switching node SN and the ground voltage VSS and has a gate receiving a second driving control signal GN. The second driving transistor 513 may be an NMOS transistor.

The inductor 514 is connected between the switching node SN and a first output node NO1. An inductor current IND flows from the switching node SN to the first output node NO1 and the capacitor C1 is coupled between the first output node NO1 and the ground voltage VSS. The conversion voltage CV is provided at the first output node NO1. The current sensor CV1 senses the inductor current IND flowing from the switching node SN to the first output node NO1 to generate a current signal CS based on the sensed current ISEN and provides the current signal CS to the on-time generator 516.

The on-time generator 516 generates an on-time signal TON determining on-time of the first driving transistor 512 and the second driving transistor 513 based on the current signal CS and the control voltage signal VCTL and provides the on-time signal TON to the gate driver 511. The gate driver 511 may determine activation interval of the first driving control signal GP1 and the second driving control signal GN and may provide the first driving control signal GP1 and the second driving control signal GN to the first driving transistor 512 and the second driving transistor 513, respectively.

The first driving transistor 512 and the second driving transistor 513 are turned-on/turned-off, respectively, based on the first driving control signal GP1 and the second driving control signal GN, and a magnitude of the inductor current IND may be determined thereby. The first driving transistor 512 and the second driving transistor 513 are complementarily turned-on/turned-off, based on the first driving control signal GP1 and the second driving control signal GN.

The first driving transistor 512 and the second driving transistor 513 charges the battery voltage VBAT in the inductor 514 in response to the first driving control signal GP1 and the second driving control signal GN having a first logic level to increase the level of the conversion voltage CV. The first driving transistor 512 and the second driving transistor 513 discharges the voltage charged in the inductor 514 in response to the first driving control signal GP1 and the second driving control signal GN having a second logic level to decrease the level of the conversion voltage CV.

Figure 22:
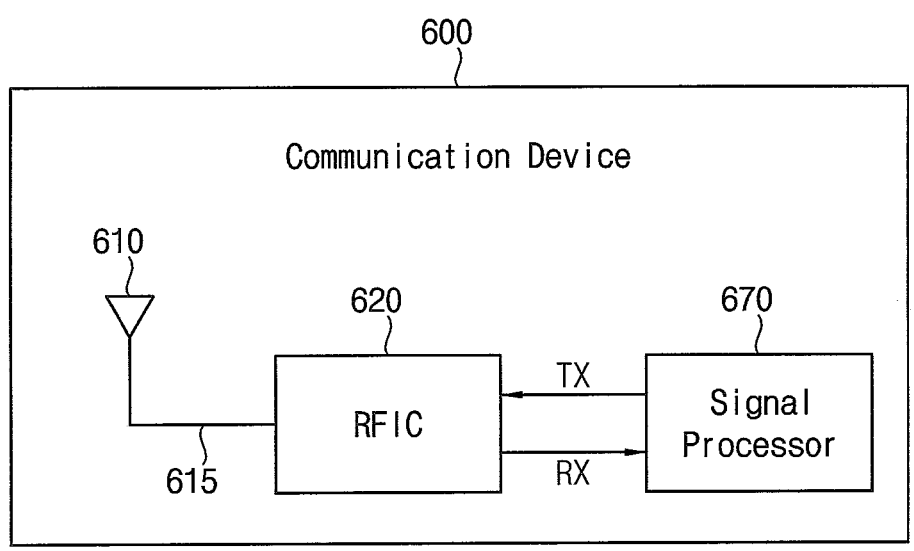
FIG. 22 is a block diagram of a communication device, according to example embodiments.

FIG. 22 is a block diagram of a communication device according to example embodiments. Referring to FIG. 22, a communication device 600 may include an antenna 610 and may communicate with another communication device in a wireless communication system by transmitting/receiving signals via the antenna 610, and may be referred to as a wireless communication device. A wireless communication system, in which the communication device 600 communicates with a counterpart communication device, may be a wireless communication system using a cellular network such as a next generation communication system, a fifth generation (5G) wireless system, a long term evolution (LTE) system, an LTE-Advanced system, a code division multiple access (CDMA) system, a global system for mobile communications (GSM) system, etc., a wireless local area network (WLAN) system, or another arbitrary wireless communication system.

As shown in FIG. 22, the communication device 600 may include the antenna 610, a radio frequency integrated circuit (RFIC) 620, and a signal processor 670, and the antenna 610 and the RFIC 620 may be connected to each other via a power feed line 615.

In the current specification, the antenna 610 may be referred to as an antenna module, and a structure including the antenna 610 and the power feed line 615 may be overall referred to as an antenna module. In addition, the antenna 610, the power feed line 615, and the RFIC 620 may be overall referred to as an RF system or an RF apparatus.

The RFIC 620 may provide the antenna 610 with a signal via the power feed line 615, wherein the signal is generated by processing a transmission signal TX from the signal processor 670 in a transmission mode and may provide the signal processor 670 with a received signal RF by processing a signal transmitted from the antenna 610 via the power feed line 615 in a reception mode. For example, the RFIC 620 may include a transmitter that may include a filter, a mixer, and a power amplifier (PA). In addition, the RFIC 620 may include a receiver that may include a filter, a mixer, a low-noise amplifier (LNA). In some embodiments, the RFIC 620 may include a plurality of transmitters and a plurality of receivers, or may include a transceiver in which a transmitter is combined with a receiver. In some embodiments, the RFIC 620 may include a plurality of transceivers.

The signal processor 670 may generate a transmission signal TX by processing a signal including information to be transmitted and may generate the signal including information by processing a received signal RX. For example, the signal processor 6700 may include an encoder, a modulator, and a digital-to-analog converter (DAC) in order to generate the transmission signal TX. In addition, the signal processor 670 may include an analog-to-digital converter (ADC), a demodulator, and a decoder in order to process the received signal RX. The signal processor 670 may generate a control signal for controlling the RFIC 620. The signal processor 300 may set a transmission mode or a reception mode, or adjust electric power and gains of elements included in the RFIC 200 via the control signal.

In some embodiments, the signal processor 670 may include one or more cores, and a memory that stores instructions executed by the one or more cores, and at least a part of the signal processor 670 may include a software block stored in the memory. In some embodiments, the signal processor 670 may include a logic circuit designed by logic synthesis, and at least a part of the signal processor 670 may include a hardware block implemented as a logic circuit.

The wireless communication system may regulate a high spectrum band for a large data transmission amount. For example, a 5G cellular system (or 5G wireless system) officially designated as IMT-2020 by the International telecommunication union (ITU) regulates millimeter waves (mmWave) of 24 GHz or greater.

The antenna 610 according to an embodiment may be configured to transmit/receive (or radiate electromagnetic waves in an RF band) signals in the RF band that is used in data transmission of mmWave, and moreover the antenna 610 may be configured to transmit/receive signals (or radiate electromagnetic waves in a low frequency band) in a low frequency band that is relatively low as compared with the RF band. The antenna 610 may be a multi-band antenna capable of supporting RF signal transmission/reception in at least two frequency bands. In addition, the antenna 610 may be configured to perform multi-polarized radiation of the electromagnetic waves, in addition to the support of multi-band.

Figure 23:
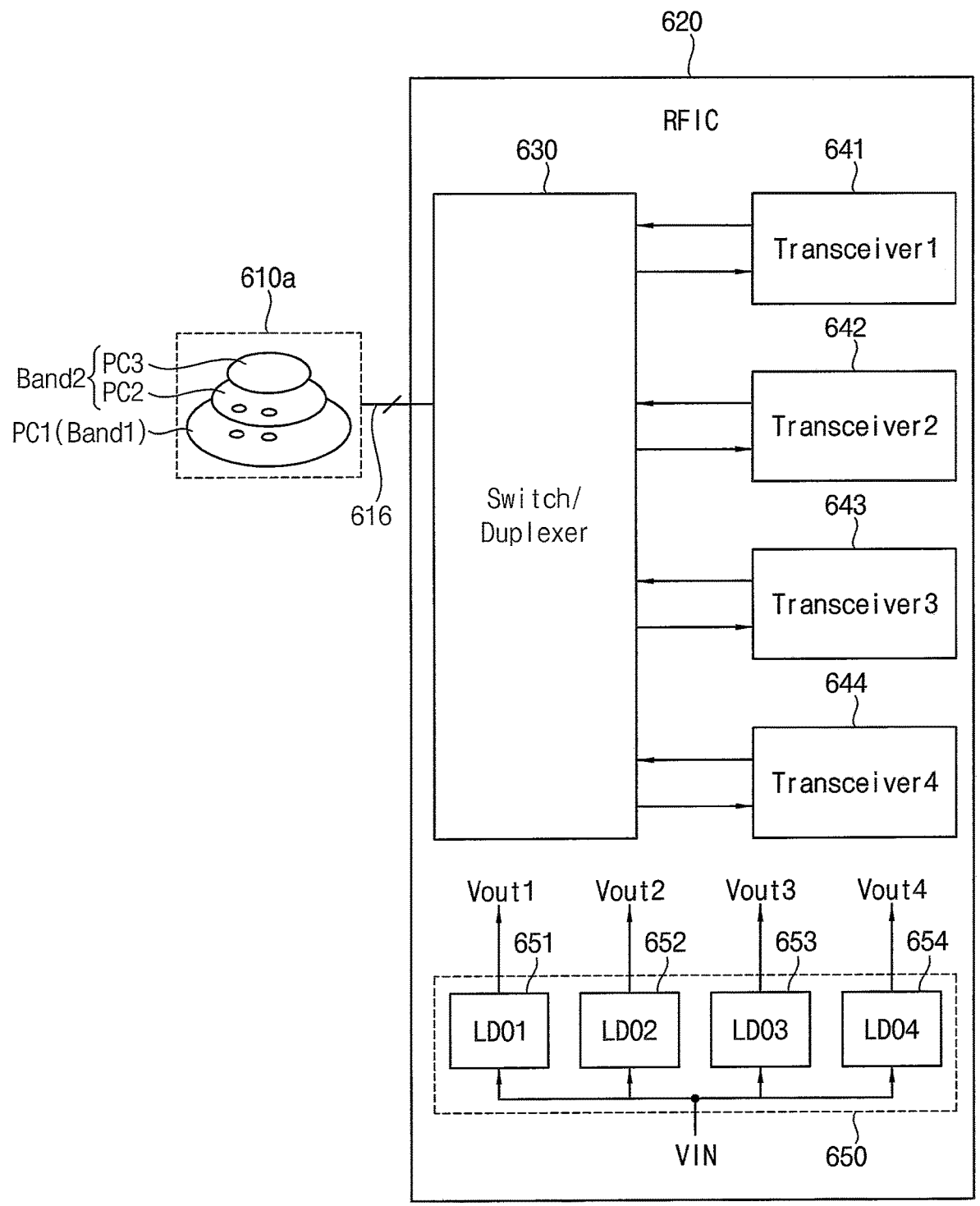
FIG. 23 is a block diagram of an antenna and an RFIC in FIG. 22, according to example embodiments.

FIG. 23 is a block diagram of an antenna and an RFIC in FIG. 22 according to example embodiments. FIG. 23 shows an antenna 610 including two antenna patches of dual-fed, dual-polarization, and a 3-stack structure, and the RFIC 620 including first to fourth transceivers 641 to 644.

The RFIC 620 may be connected to the antenna 610 via four power feed lines corresponding to four ports of the antenna 610. For example, an antenna module including the antenna 610 and power feed lines 616 may be disposed on the RFIC 620 and at least one connection may be formed on an upper surface of the RFIC 620 and a lower surface of the antenna module. The antenna 610 may receive differential signals from the RFIC 620 via the four power feed lines 616 respectively connected to the four power feed points in a first antenna patch PC1 and a second antenna patch PC2. To this end, a pair of transceivers included in the RFIC 620 may generate one differential signal, and accordingly, four transceivers 641 to 644 may generate two differential signals.

A switch/duplexer 630 may connect/disconnect output terminals or input terminals of the four transceivers, that is, the first to fourth transceivers 641 to 644 to/from the four power feed lines 616, according to a transmission mode or a reception mode. According to the configuration shown in FIG. 17, in some embodiments, the first transceiver 641 and the second transceiver 642 may be connected to the first antenna patch PC1 via the switch/duplexer 630 to perform signal transmission/reception in the first frequency band Band1, and the third transceiver 643 and the fourth transceiver 644 may be connected to the second antenna patch PC2 and the third antenna patch PC3 via the switch/duplexer 630 to perform the signal transmission/reception in the second frequency band Band2.

A PMIC 650 may include first through fourth LDO regulators 651~654. The first through fourth LDO regulators 651~654 may regulate an input voltage VIN to generate output voltages Vout1~Vout4, respectively and may provide the output voltages Vout1~Vout4 to respective one of the first through fourth LDO regulators 651~654. Each of the first through fourth LDO regulators 651~654 may employ the LDO regulator 10 of FIG. 1. Therefore, each of the first through fourth LDO regulators 651~654 may receive a reference voltage and an output voltage provided from an output node, may generate a voltage pulse signal having a sign associated with a relative magnitude of the output voltage VOUT with respect to the reference voltage and a first pulse width proportional to a difference between the reference voltage and the output voltage based on a difference between the reference voltage and the output voltage, may charge or discharge the gate node with a driving current corresponding to the first pulse width, may selectively discharge the gate node with a slew adjusting current based on the voltage pulse signal if the first pulse width is greater than a reference time interval to increase slew rate of the output voltage and may provide the output node with a compensation current corresponding to the first pulse width to enhance frequency characteristic of each of the first through fourth LDO regulators 651~654.

Figure 24:
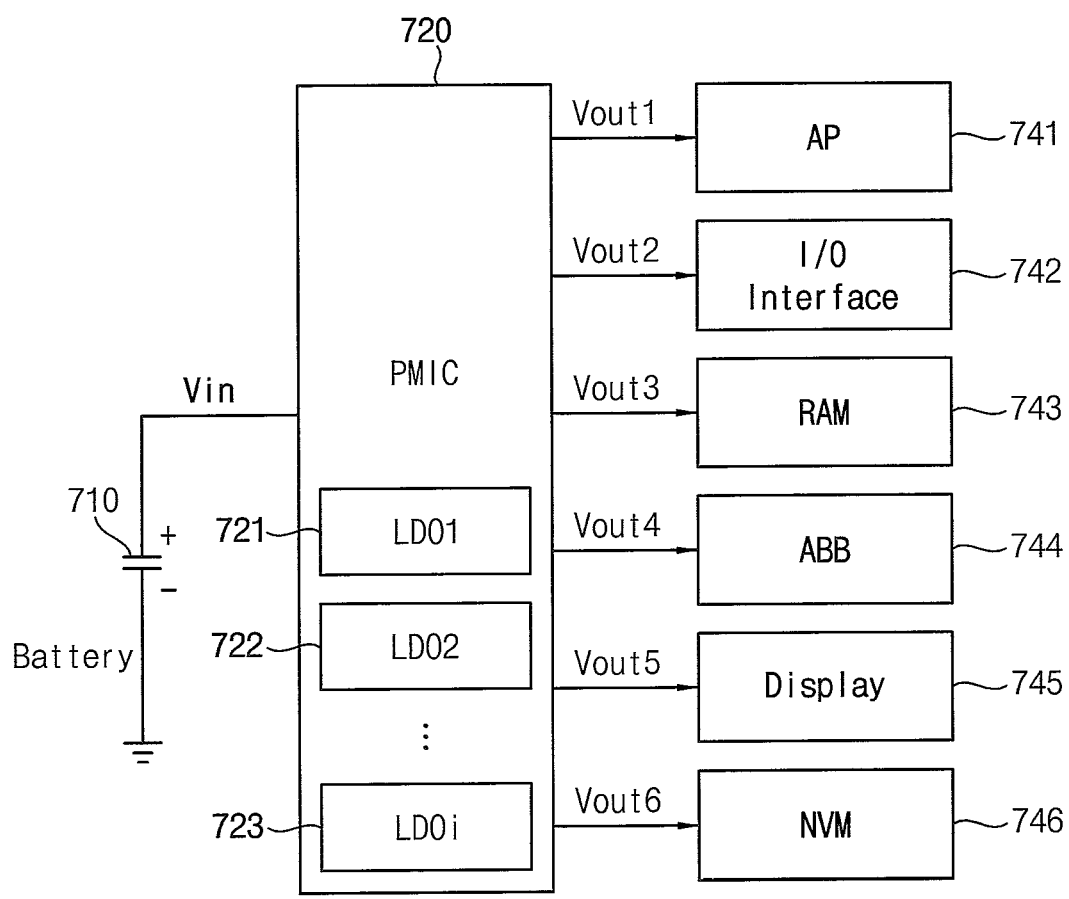
FIG. 24 is a block diagram briefly illustrating a mobile device, according to example embodiments.

FIG. 24 is a block diagram briefly illustrating a mobile device according to example embodiments. Referring to FIG. 24, a mobile device 700 may include a battery 710, a PMIC 720, an application processor (AP) 741, an input/output interface unit (or input/output interface) 742, a random access memory (RAM) 743, an analog baseband chipset (ABB) 744, a display device 745 and a nonvolatile memory 745.

The PMIC 720 transforms an input voltage VIN supplied from the battery 710 into output voltage Vout1 to Vout6 having various levels and provides the output voltage Vout1 to Vout6 to Vout6 to various load devices. Here, the PMIC 720 may include a plurality of LDO regulators LDO1~LDOi.

Each of the plurality of LDO regulators LDO1~LDOi may employ the LDO regulator 10 of FIG. 1. Therefore, each of the plurality of LDO regulators LDO1~LDOi may receive a reference voltage and an output voltage provided from an output node, may generate a voltage pulse signal having a sign associated with a relative magnitude of the output voltage VOUT with respect to the reference voltage and a first pulse width proportional to a difference between the reference voltage and the output voltage based on a difference between the reference voltage and the output voltage, may charge or discharge the gate node with a driving current corresponding to the first pulse width, may selectively discharge the gate node with a slew adjusting current based on the voltage pulse signal if the first pulse width is greater than a reference time interval to increase slew rate of the output voltage and may provide the output node with a compensation current corresponding to the first pulse width to enhance frequency characteristic of each of the LDO regulators LDO1~LDOi.

The mobile device 700 may be installed using a package of various forms. For example, the PMIC 720, the AP 741, the input/output interface unit 742, the RAM 743, the ABB 744, the display device 745 and the nonvolatile memory 745 may be installed using packages such as a package on package (PoP), a ball grid arrays (BGAs), a chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small outline integrated circuit (SOIC), a shrink small outline package (SSOP), a thin small outline package (TSOP), a thin quad flat pack (TQFP), a system in package (SIP), a multi-chip package (MCP), a wafer-level fabricated package (WFP), and a wafer-level processed stack package (WSP).

Figure 25:
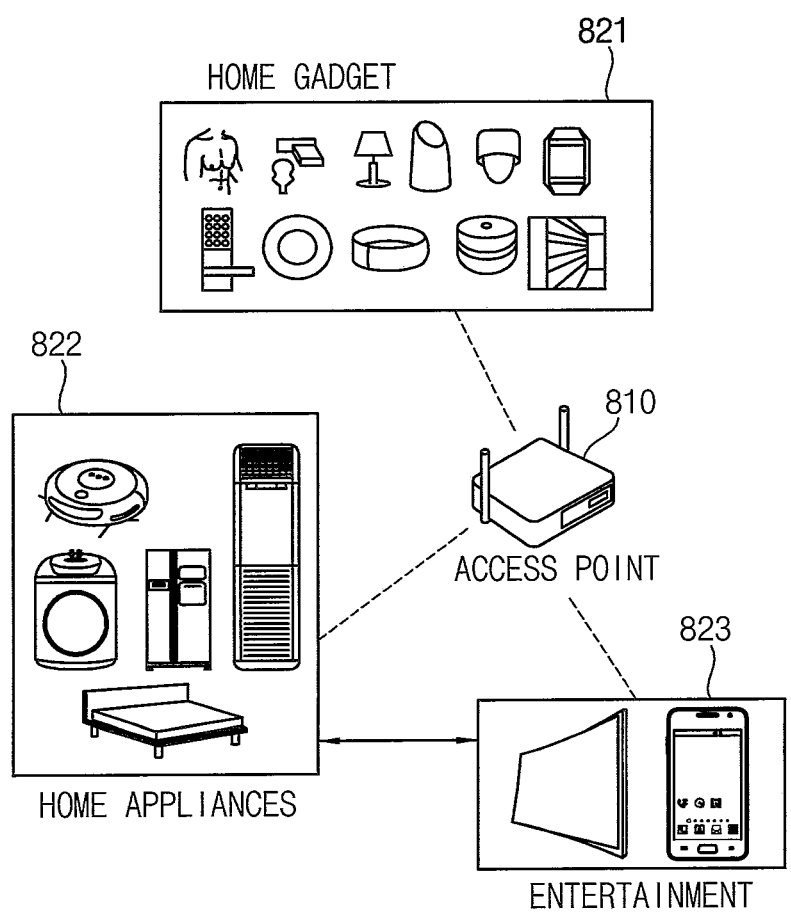
FIG. 25 is a diagram showing examples of a communication device, according to example embodiments.

FIG. 25 is a diagram showing examples of a communication device according to example embodiments. In detail, FIG. 25 shows an example in which various wireless communication devices communicate with each other in a wireless communication system using WLAN. Each of the wireless communication devices shown in FIG. 19 may include multi-band and multi-polarization antennas, in which a plurality of antenna patches are stacked, and an RFIC providing differential signals to the multi-band and multi-polarization antennas.

Home gadgets 821, home appliances 822, entertainment devices 823, and an access point (AP) 810 may configure an Internet of Thing (IoT) network system. Each of the home gadgets 821, the home appliances 822, the entertainment devices 823, and the AP 810 may include a transceiver according to one or more embodiments as a component. The home gadgets 821, the home appliances 822, and the entertainment devices 823 may wirelessly communicate with the AP 810, or may wirelessly communicate with one another.

Example embodiments may be applied to various systems including a memory module and a memory controller that includes an ECC engine.

While the present disclosure has been particularly shown and described with reference to the example embodiments thereof, it will be understood by those of ordinary skill in the art that various changes in form and detail may be made therein without departing from the spirit and scope of the present disclosure as defined by the following claims.

What is claimed is:

1. A low drop-out (LDO) regulator, comprising:
a voltage-to-time converter (VTC) responsive to a reference voltage and an output voltage, which is fed-back from an output node, said VTC configured to generate a voltage pulse signal having: (i) a sign associated with a magnitude of the output voltage relative to a magnitude of the reference voltage, and (ii) a first pulse width proportional to a difference in magnitude between the output voltage and the reference voltage;
a driving time-to-current converter (TIC) configured to drive a gate node with a non-zero driving current having a magnitude proportional to the first pulse width of the voltage pulse signal, in response to the sign of the voltage pulse signal indicating that the relative magnitude of the output voltage to the reference voltage has a non-zero value;
a slew adjusting circuit configured to drive the gate node with a non-zero slew adjusting current, in response to the first pulse width of the voltage pulse signal being equal to or greater than a reference time interval;
a pass transistor having a gate terminal electrically connected to the gate node, a first current carrying terminal responsive to an input voltage, and a second current carrying terminal electrically coupled to the output node; and
a compensation TIC configured to drive the output node with a non-zero compensation current having a magnitude proportional to the first pulse width of the voltage pulse signal, in response to the sign of the voltage pulse signal indicating that the relative magnitude of the output voltage to the reference voltage has a non-zero value.

2. The LDO regulator of claim 1, wherein the VTC is configured to generate the voltage pulse signal having an on-time corresponding to the first pulse width as a down signal in response to the sign indicating that the output voltage is less than the reference voltage; and wherein the driving TIC is configured to discharge the gate node in response to the down signal.

3. The LDO regulator of claim 1, wherein the VTC is configured to generate the voltage pulse signal having an on-time corresponding to the first pulse width as an up signal in response to the sign indicating that the output voltage is greater than the reference voltage; and wherein the driving TIC is configured to drive the gate node in response to the up signal.

4. The LDO regulator of claim 1, wherein the VTC includes:
a first voltage controlled delay line, which is configured to output a first delayed clock signal by delaying a clock signal based on a magnitude of the reference voltage;
a second voltage controlled delay line, which is configured to output a second delayed clock signal by delaying the clock signal based on a magnitude of the output voltage; and
a phase/frequency detector configured to: (i) detect a phase difference between the first delayed clock signal and the second delayed clock signal, and (ii) generate the voltage pulse signal including a down signal or an up signal having an on-time corresponding to the first pulse width based on the phase difference between the first delayed clock signal and the second delayed clock signal.

5. The LDO regulator of claim 4, wherein the first voltage controlled delay line includes:
a plurality of first inverters, which are: (i) cascaded in series, (ii) configured to receive the clock signal, and (iii) configured to output the first delayed clock signal by delaying the clock signal; and
a plurality of first n-channel metal-oxide semiconductor (NMOS) transistors, which are each connected between a corresponding one of odd inverters from among the plurality of first inverters and a ground voltage, and have respective gates responsive to the reference voltage, and
wherein the second voltage controlled delay line includes:
a plurality of second inverters which are: (i) cascaded in series, (ii) configured to receive the clock signal, and (iii) configured to output the second delayed clock signal by delaying the clock signal; and
a plurality of second NMOS transistors, which are connected between a corresponding one of odd inverters from among the plurality of second inverters and the ground voltage, and have respective gates responsive to the output voltage.

6. The LDO regulator of claim 1, wherein the VTC includes:
a first voltage controlled delay line configured to output a first delayed clock signal by delaying a clock signal based on a magnitude of the reference voltage;
a second voltage controlled delay line configured to output a second delayed clock signal by delaying the clock signal based on a magnitude of the output voltage;
a time amplifier configured to amplify the first delayed clock signal and the second delayed clock signal; and
a phase/frequency detector configured to: (i) detect a phase difference between the amplified first delayed clock signal and the amplified second delayed clock signal, and (ii) generate the voltage pulse signal, including a down signal or an up signal having an on-time corresponding to the pulse width, based on the detected phase difference.

7. The LDO regulator of claim 1, wherein the slew adjusting circuit includes:
slew detection logic configured to: (i) receive the voltage pulse signal, (ii) detect that the first pulse width of the voltage pulse signal is equal to or greater than a reference time interval during a switching period of the LDO regulator, and (iii) generate a slew detection signal having a second pulse width corresponding a difference between the first pulse width and the reference time interval; and
a slew adjusting TIC configured to receive the slew detection signal and drive the gate node with the slew adjusting current proportional to the second pulse width of the slew detection signal.

8. The LDO regulator of claim 7, wherein the slew detection logic includes:
a delay circuit configured to delay the voltage pulse signal by a first delay amount; and
an AND gate configured to perform an AND operation on the voltage pulse signal and an output of the delay circuit, and generated the slew detection signal; and
wherein the first delay amount of the delay circuit corresponds to the reference time interval.

9. The LDO regulator of claim 7, wherein the slew adjusting TIC includes:
- an n-channel metal-oxide semiconductor (NMOS) transistor connected between the gate node and the ground voltage; and
- a p-channel metal-oxide semiconductor (PMOS) transistor connected between the input voltage and the gate node;
- wherein the NMOS transistor is turned-on to connect the gate node to the ground voltage in response to a down signal, if the output voltage is smaller than the reference voltage and the first pulse width is equal to or greater than the reference time interval, and
- wherein the PMOS transistor is turned-on to drive the gate node with the slew adjusting current in response to an up signal, if the output voltage is greater than the reference voltage and the first pulse width is equal to or greater than the reference time interval.

10. A low drop-out (LDO) regulator, comprising:
- a voltage to time converter (VTC) configured to receive a reference voltage and an output voltage provided from an output node, and configured to generate a voltage pulse signal having a sign and a first pulse width, the sign being associated with a relative magnitude of the output voltage with respect to the reference voltage, the first pulse width being proportional to a difference between the reference voltage and the output voltage;
- a driving time to current converter (TIC) configured to charge or discharge a gate node with a driving current proportional to the first pulse width of the voltage pulse signal in response to the sign indicating that the relative magnitude has a non-zero value, based on the voltage pulse signal;
- a slew adjusting circuit configured to be activated in response to the first pulse width of the voltage pulse signal being equal to or greater than a reference time interval and configured to charge or discharge the gate node with a slew adjusting current based on the voltage pulse signal;
- a pass transistor connected to the gate node, the pass transistor configured to regulate an input voltage to provide the output voltage to an output node, based on the driving current and selectively based on the slew adjusting current; and
- a compensation TIC configured to charge or discharge the output node with a compensation current corresponding to the first pulse width of the voltage pulse, in response to the sign indicating that the relative magnitude has a non-zero value, based on the voltage pulse signal.

11. The LDO regulator of claim 10, wherein:
the VTC is configured to generate the voltage pulse signal having an on-time corresponding to the first pulse width as a down signal in response to the sign indicating that the output voltage is smaller than the reference voltage; and
the driving TIC is configured to discharge the gate node in response to the down signal.

12. The LDO regulator of claim 10, wherein:
the VTC is configured to generate the voltage pulse signal having an on-time corresponding to the first pulse with as an up signal in response to the sign indicating that the output voltage is greater than the reference voltage; and
the driving TIC is configured to provide the driving current to the gate node in response to the up signal.

13. The LDO regulator of claim 10, wherein the VTC includes:
- a first voltage controlled delay line configured to output a first delayed clock signal by delaying a clock signal based on the reference voltage;
- a second voltage controlled delay line configured to output a second delayed clock signal by delaying the clock signal based on the output voltage; and
- a phase/frequency detector configured to detect a phase difference between the first delayed clock signal and the second delayed clock signal and configured to generate the voltage pulse signal including a down signal or an up signal having an on-time corresponding to the first pulse width based on the phase difference.

14. The LDO regulator of claim 13, wherein the first voltage controlled delay line includes:
- a plurality of first inverters which are cascaded connected, the plurality of first inverters configured to receive the clock signal and configured to output the first delayed clock signal by delaying the clock signal; and
- a plurality of first n-channel metal-oxide semiconductor (NMOS) transistors, each of the first NMOS transistor connected between corresponding one of odd inverters from among the plurality of first inverters and a ground voltage, each of the first NMOS transistors having a gate to receive the reference voltage, and
wherein the second voltage controlled delay line includes:
- a plurality of second inverters which are cascaded connected, the plurality of second inverters configured to receive the clock signal and configured to output the second delayed clock signal by delaying the clock signal; and
- a plurality of second NMOS transistors, each of the second NMOS transistor connected between corresponding one of odd inverters from among the plurality of second inverters and the ground voltage, each of the second NMOS transistors having a gate to receive the output voltage.

15. The LDO regulator of claim 10, wherein the VTC includes:
- a first voltage controlled delay line configured to output a first delayed clock signal by delaying a clock signal based on the reference voltage;
- a second voltage controlled delay line configured to output a second delayed clock signal by delaying the clock signal based on the output voltage;
- a time amplifier configured to amplify the first delayed clock signal and the second delayed clock signal; and
- a phase/frequency detector configured to detect a phase difference between the amplified first delayed clock signal and the amplified second delayed clock signal and configured to generate the voltage pulse signal including a down signal or an up signal having an on-time corresponding to the pulse with based on the phase difference.

16. The LDO regulator of claim 10, wherein the slew adjusting circuit includes:
- a slew detection logic configured to receive the voltage pulse signal, configured to detect that the first pulse width of the voltage pulse signal is equal to or greater than a reference time interval during a switching period of the LDO regulator and configured to generate a slew detection signal having a second pulse width corresponding a difference between the first pulse width and the reference time interval; and
- a slew adjusting TIC configured to receive the slew detection signal and configured to provide the gate node with the slew adjusting current proportional to the second pulse width of the slew detection signal.

17. The LDO regulator of claim 16, wherein the slew detection logic includes:
a delay circuit configured to delay the voltage pulse signal by a first delay amount; and
an AND gate configured to perform an AND operation on the voltage pulse signal and an output of the delay circuit to output the slew detection signal,
wherein the first delay amount of the delay circuit corresponds to the reference time interval.

18. The LDO regulator of claim 16, wherein slew adjusting TIC includes:
an n-channel metal-oxide semiconductor (NMOS) transistor connected between the gate node and the ground voltage; and
a p-channel metal-oxide semiconductor (PMOS) transistor connected between the input voltage and the gate node,
wherein the NMOS transistor is turned-on to connect the gate node to the ground voltage in response to a down signal corresponding to the slew detection signal having an on-time corresponding to a second pulse width corresponding to a difference between the first pulse width and the reference time interval, if the output voltage is smaller than the reference voltage and the first pulse width is equal to or greater than the reference time interval, and
wherein the PMOS transistor is turned-on to provide the gate node with the slew adjusting current based on the input voltage in response to an up signal corresponding to the slew detection signal having an on-time corresponding to the second pulse width corresponding to a difference between the first pulse width and the reference time interval, if the output voltage is greater than the reference voltage and the first pulse width is equal to or greater than the reference time interval.

19. The LDO regulator of claim 10, wherein the compensation TIC includes:
a p-channel metal-oxide semiconductor (PMOS) transistor connected between the input voltage and the output node; and
an n-channel metal-oxide semiconductor (NMOS) transistor connected between the output node and the ground voltage,
wherein the PMOS transistor is turned-on to provide the output node with the compensation current based on the input voltage in response to an up signal corresponding to the voltage pulse signal having an on-time corresponding to the first pulse width, if the output voltage is smaller than the reference voltage, and
wherein the NMOS transistor is turned-on to connect the output node to the ground voltage in response to inverted up signal having an on-time corresponding to the first pulse width, if the output voltage is greater than the reference voltage.

20. A low drop-out (LDO) regulator, comprising:
a voltage to time converter (VTC) configured to receive a reference voltage and an output voltage provided from an output node, and configured to generate a voltage pulse signal having a sign and a first pulse width, the sign being associated with a relative magnitude of the output voltage with respect to the reference voltage, the pulse with being proportional to a difference between the reference voltage and the output voltage;
a driving time to current converter (TIC) configured to charge or discharge a gate node with a driving current proportional to the pulse with of the voltage pulse signal in response to the sign indicating that the relative magnitude has a non-zero value, based on the voltage pulse signal;
a slew adjusting circuit configured to be activated in response to the pulse with of the voltage pulse signal being equal to or greater than a reference time interval and configured to charge or discharge the gate node with a slew adjusting current based on the voltage pulse signal to increase a slew rate of the output voltage;
a pass transistor connected to the gate node, the pass transistor configured to regulate an input voltage to provide the output voltage to an output node, based on the driving current and selectively based on the slew adjusting current; and
a compensation TIC configured to charge or discharge the output node with a compensation current corresponding to the first pulse width of the voltage pulse, in response to the sign indicating that the relative magnitude has a non-zero value, based on the voltage pulse signal, and
wherein the slew adjusting circuit is:
configured to detect that the pulse with of the voltage pulse signal is equal to or greater than a reference time interval during a switching period of the LDO regulator and configured to generate a slew detection signal having a second pulse width corresponding a difference between the first pulse width and the reference time interval; and
configured to provide the gate node with the slew adjusting current proportional to the second pulse width of the slew detection signal.

* * * * *